June 14, 1960 L. GARWIN 2,940,920
SEPARATION OF ASPHALT-TYPE BITUMINOUS MATERIALS
Filed Feb. 19, 1959 5 Sheets-Sheet 1
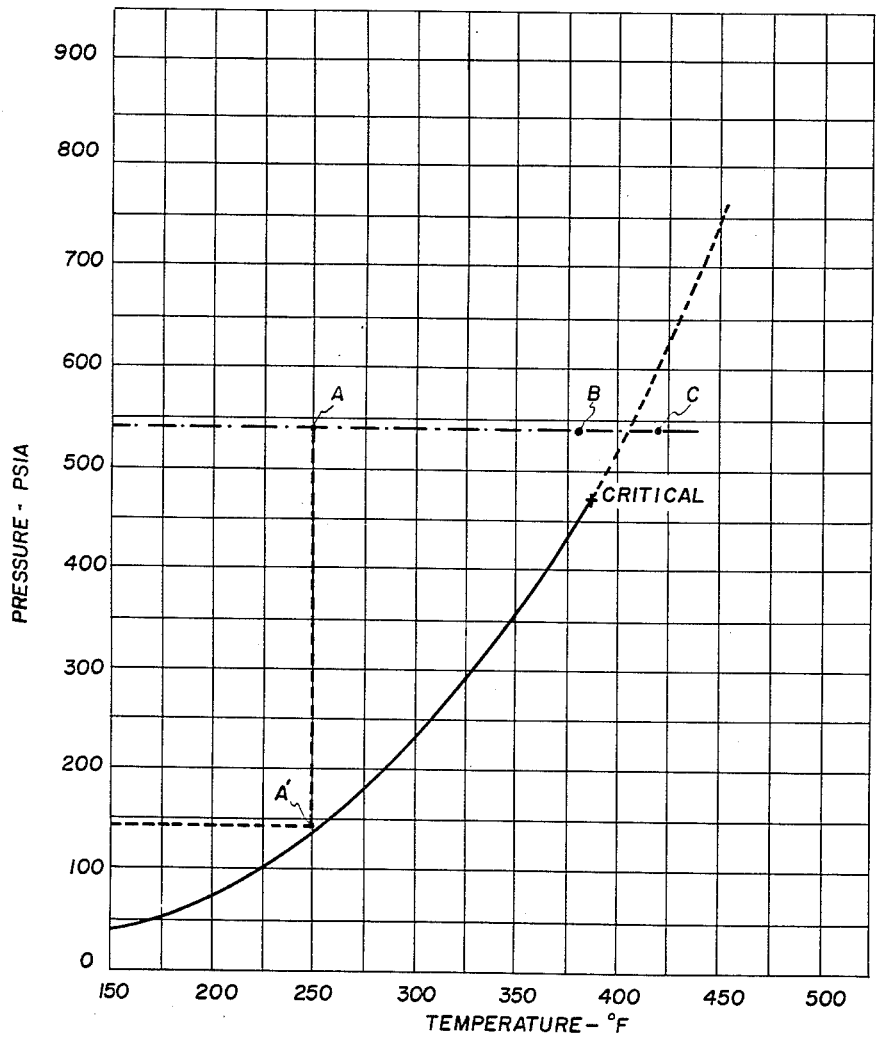
EXTRAPOLATED PENTANE VAPOR PRESSURE CURVE
INVENTOR
LEO GARWIN,
BY
ATTORNEY

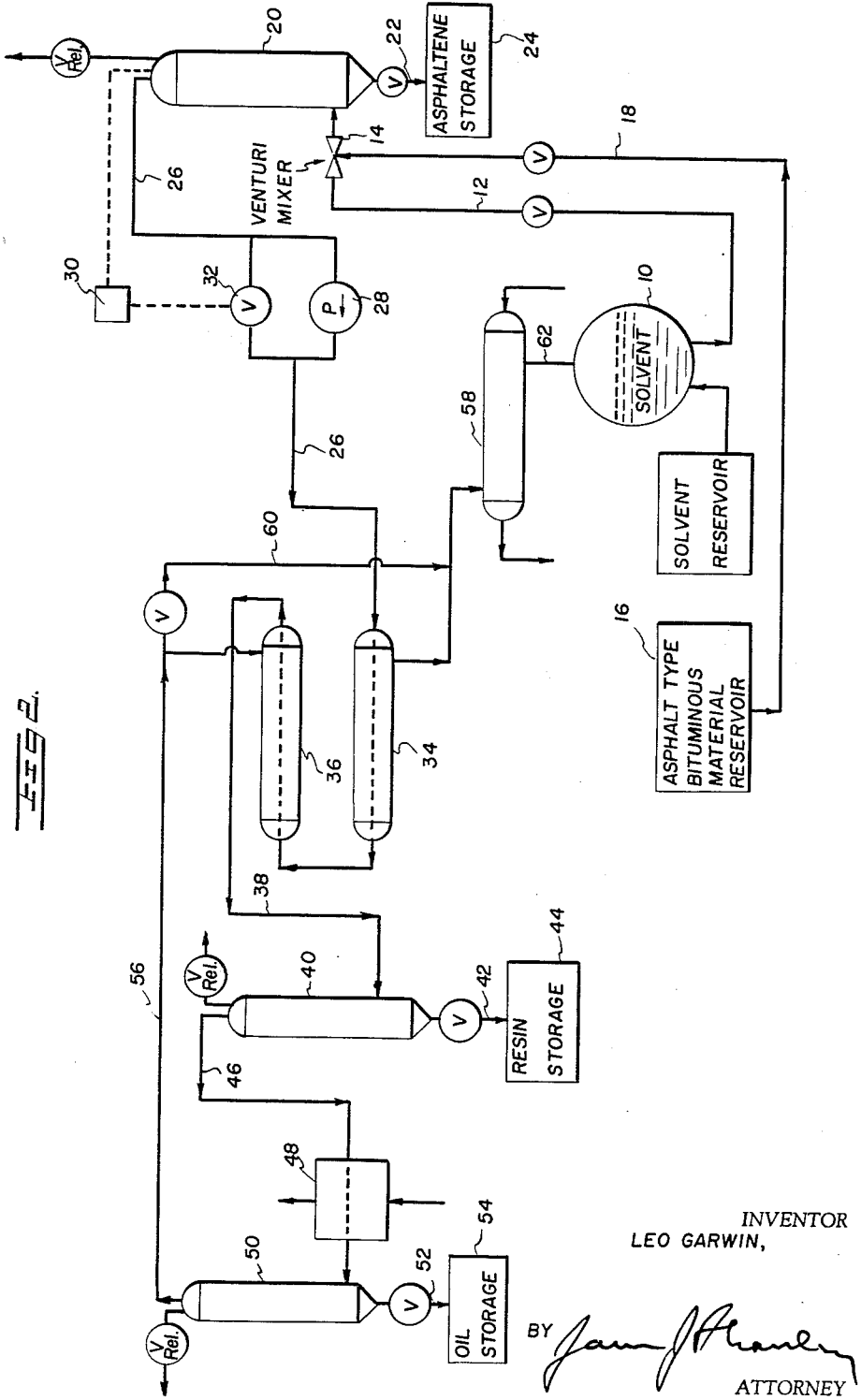

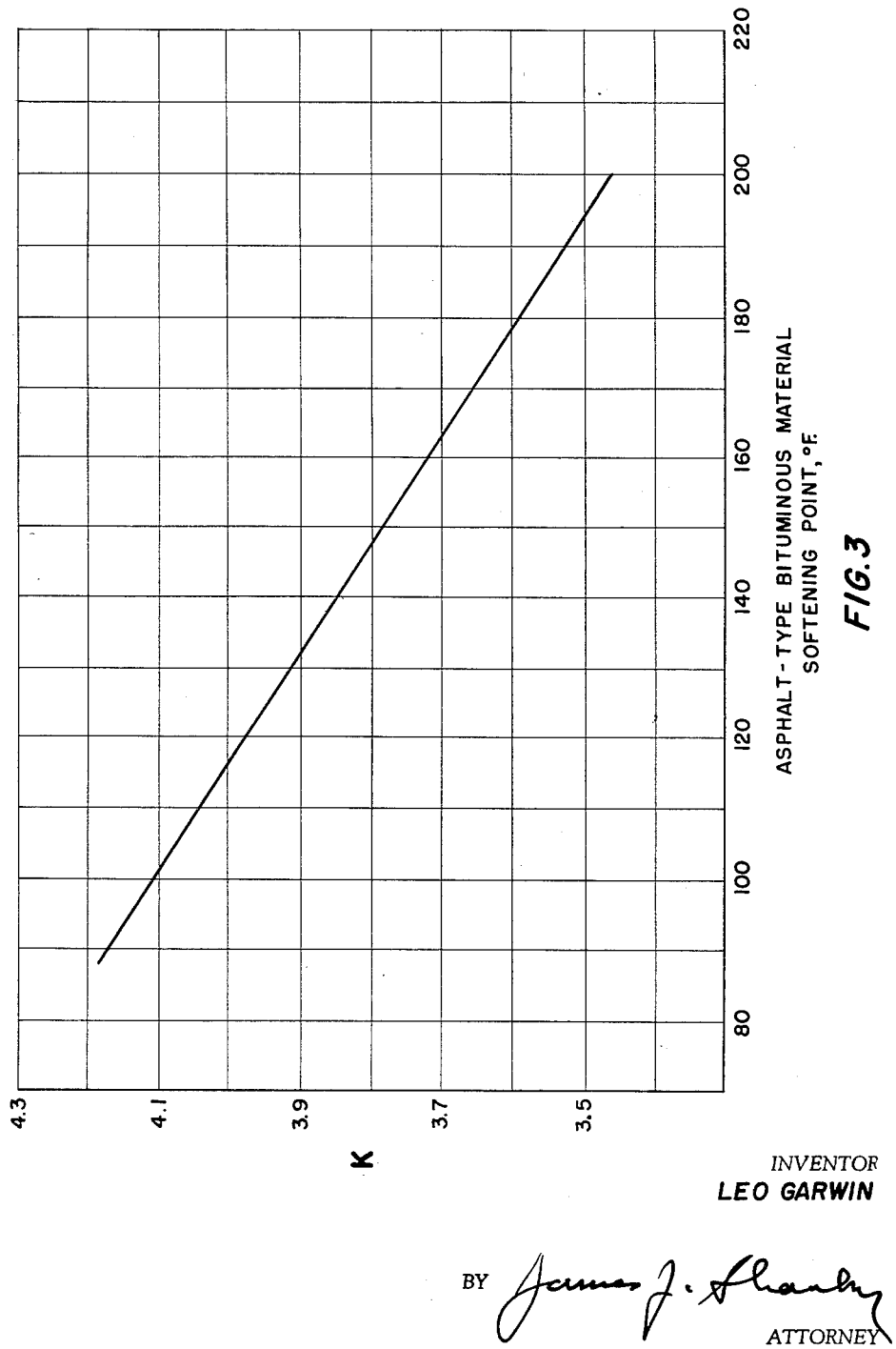

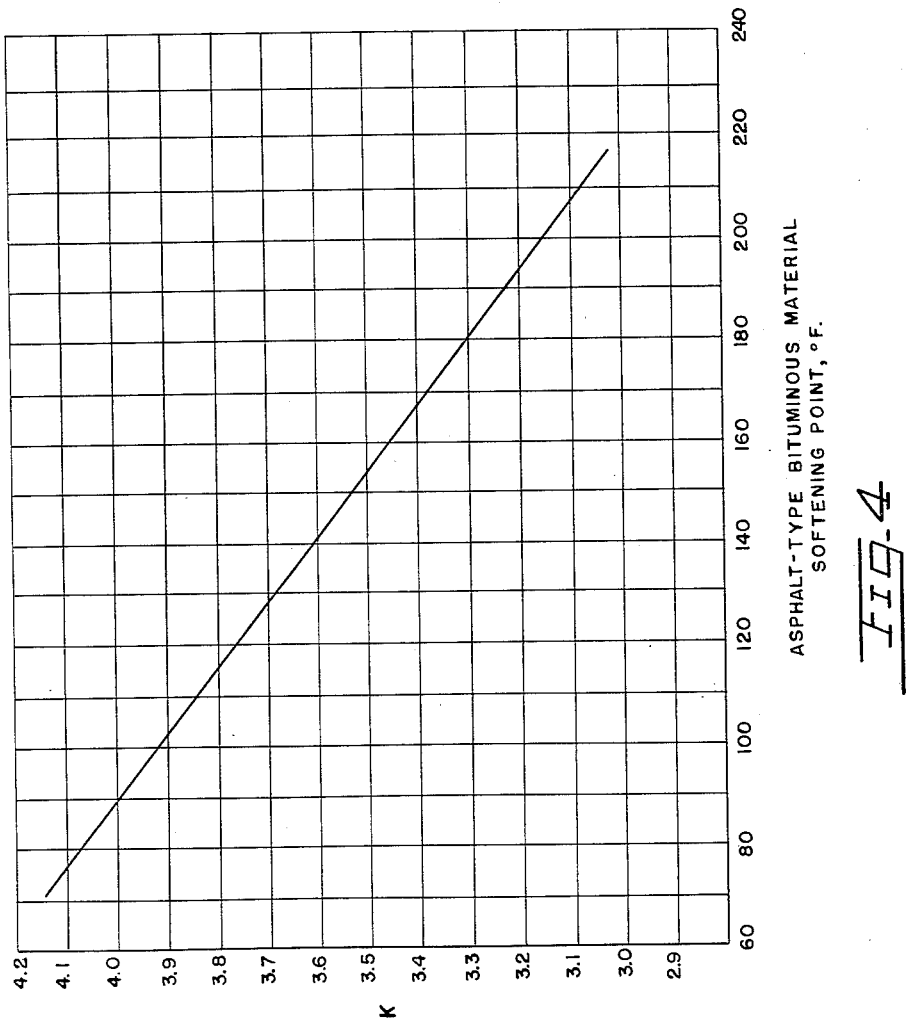

June 14, 1960  L. GARWIN  2,940,920
SEPARATION OF ASPHALT-TYPE BITUMINOUS MATERIALS
Filed Feb. 19, 1959  5 Sheets-Sheet 5
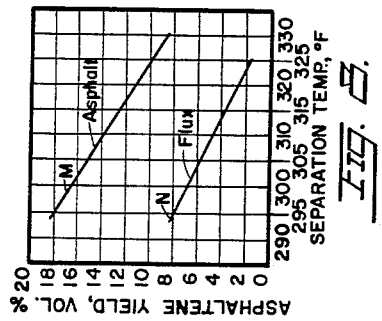
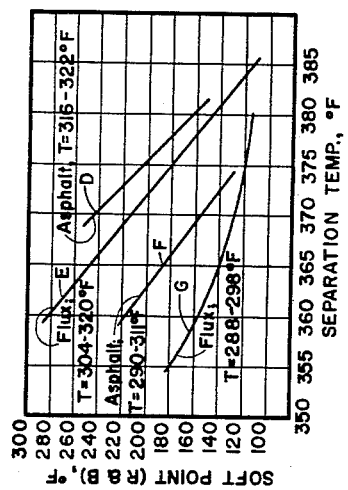
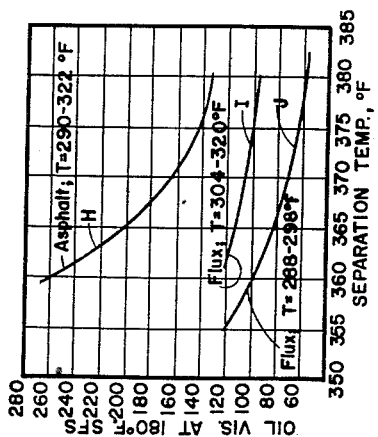
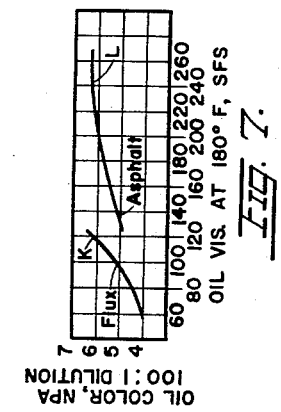
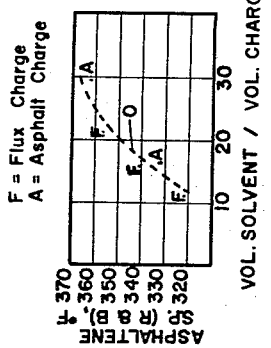
INVENTOR.
LEO GARWIN
BY Shanley & O'Neil
ATTORNEYS

United States Patent Office 2,940,920
Patented June 14, 1960

2,940,920

SEPARATION OF ASPHALT-TYPE BITUMINOUS MATERIALS

Leo Garwin, Oklahoma City, Okla., assignor to Kerr-McGee Oil Industries, Inc., a corporation of Delaware Filed Feb. 19, 1959, Ser. No. 794,369

47 Claims. (Cl. 208—45)

The present invention relates to a method of separating an asphalt-type bituminous material into two or more fractions. More particularly, the present invention relates to a novel method of separating an asphalt-type bituminous material into at least two fractions at a greatly improved rate of separation and in a manner which eliminates operating difficulties by use of one or a mixture of certain hydrocarbon solvents.

This application is a continuation-in-part of copending application Serial Number 631,351, filed December 28, 1956, for "Separation of Asphalt-Type Bituminous Materials," in my name as co-inventor with Jack W. Roach and Kenton E. Hutchison as the remaining co-inventors, and by copending application Serial Number 632,381, filed January 3, 1957, for "Separation of Asphalt-Type Bituminous Materials." Application Serial Number 631,351, is, in turn, a continuation-in-part of application Serial Number 377,201, filed August 28, 1953, in my name as co-inventor with Jack W. Roach and Kenton E. Hutchison as the remaining co-inventors, now abandoned; while application Serial Number 632,381 is, in turn, a continuation-in-part of my application Serial Number 435,944, filed June 10, 1954, now abandoned.

The term "asphalt-type bituminous material" as used in the specification and claims is intended to include pyrogenous and naturally occurring asphalts (bitumens and pyrobitumens), one or more fractions or components thereof, or products obtained by blowing or otherwise treating these materials or one or more of their components or fractions with air or another oxygen-containing gas in the presence or absence of catalysts. Examples of naturally occurring asphalts include asphaltic crudes such as, for example, low gravity asphaltic crudes, gilsonite, grahamite, wurtzilite, albertite, elaterite and native asphalts, such as Trinidad asphalt. Examples of pyrogenous asphalts include reduced crudes such as, for example, vacuum or steam reduced crudes and pressure or cracked tars. Blown asphalt-type bituminous material include those blown either in the presence or absence of catalysts such as phosphorous pentoxide, ferric chloride, cobaltic salts, etc. The term "one or more fractions or components thereof" is intended to include an asphalt-type bituminous material from which a portion or the total asphaltene content has been removed, for example, by the method described in copending application Serial Number 218,480, filed March 30, 1951, now U.S. Patent No. 2,783,188, or an asphalt-type bituminous material from which the asphaltenes as well as a portion of the resin content has been removed by, for example, the same method. The term "otherwise treating" is intended to include condensation of asphalt-type bituminous material in the presence of a suitable treating agent to produce heavier or more complex materials of a bituminous nature. Examples of suitable treating agents are catalysts of the Friedel-Craft type, or those disclosed by Hersberger in United States Patent Number 2,247,375.

Since asphalt-type bituminous materials are highly complex mixtures of a very large number of compounds covering a wide range of structures and molecular weights, it is customary to characterize their composition by solubility in definite amounts of arbitrarily selected solvents. Thus, when, for example, such a material is thoroughly mixed at room temperature with a paraffin hydrocarbon solvent containing from four to eight carbon atoms, inclusive, and certain other solvents, the undissolved portion settling out as solids is broadly classified ordinarily as "asphaltenes" and the soluble portion as "a mixture of resins and oils" or as "petrolenes." Since the amount of material that settles out varies somewhat with each of these solvents, the undissolved portion is sometimes more specifically designated as "normal pentane asphaltenes," "isopentane asphaltenes," etc.

As a rule, the average molecular weight and structural complexity increases from the oily to the resinous fraction and finally to the undissolved fraction or asphaltenes. Generally, these three fractions or categories differ in their physical and chemical behavior. However, it is believed that there are individual members of each group which are borderline cases and which may fall into one fraction or category or another depending upon the treatment used, e.g., the kind and amount of solvent. Hence, from the foregoing discussion of the nature of asphalt-type bituminous materials, it will be appreciated that the terms "asphaltenes," "resins" and "oils," as applied to asphalt-type bituminous materials refer to broad classes or categories of the constituents of asphalt-type bituminous materials, the exact composition being dependent upon the particular asphalt-type bituminous material from which they were derived, the agents, such as solvents, employed for separating these fractions from each other, the conditions including solvent ratio (by volume) and temperature employed for carrying out the separation, and a number of other factors. Nevertheless, these terms provide a convenient means for those skilled in the art to refer to broad classes of the constituents of asphalt-type bituminous materials which do possess varied physical properties even though, for example, an asphaltene may contain some constituents which are the same as those occurring in the resins.

Each of the fractions or categories into which asphalt-type bituminous materials may be separated is useful for purposes for which the parent material is not suitable or when used for the same purpose, gives results which are new and useful. Thus, when the parent material is steam or vacuum-reduced asphalt, the oils have lubricating properties, the resins are useful in coating compositions and as extenders in plastics manufacture and the asphaltenes are useful as rubber extenders and in coating compositions. Solutions of an asphaltene fraction prepared in accordance with the present invention are particularly desirable for use in coating compositions, as such solutions have been found to be non-gelling in nature. Solutions of such asphaltenes also have lower viscosities than solutions of other bitumens of comparable softening point on the same non-volatile basis. Further, the asphaltenes of the invention have a greater compatibility with bodied drying oils than does gilsonite. The resins, oils and asphaltenes may be used singly or in combination as additives to modify the properties of asphalt-type bituminous materials.

Asphaltenes characterized by high softening points are particularly desirable in certain applications. For example, in the manufacture of asphaltic tile and similar materials, a softening point of 300° F. or higher is very desirable. In addition, numerous other uses for asphaltenes require an asphaltene having a softening point varying between about 300° F. and 400° F. Particularly are asphaltenes having a softening point of at least 300° F. desirable where they form solutions which are essentially non-gelling and of relatively low viscosity for solutions of this nature.

Asphalt-type bituminous material has been separated heretofore into an asphaltene fraction having a softening point of about 280° F. by various methods involving treatment with light hydrocarbon solvents. One such method utilizes a solvent such as propane or butane at ambient temperature and substantially equilibrium pressure to precipitate asphaltenes having a softening point of about 280° F. as a solid. The resulting solid precipitate prevents continuous normal tower operation since the solid asphaltenes tend to plug the tower, particularly in the section of the tower immediately below the feed entry point. Efforts made to obtain liquid phase separation of an asphaltene fraction having a softening point of at least 300° F. have been unsuccessful and have resulted in extensive tower plugging. While it is possible to separate semi-liquid phase asphalt fractions characterized by softening points of 275° F. or below in accordance with prior art teachings, such materials require further treatment with solvent to obtain asphaltenes having a desirable softening point, i.e., 300° F. or higher. Liquid phase heavy fractions having softening points of about 265° F. have heretofore been obtainable only if means were utilized to effectively flux the asphaltene-resin mixture with oils, etc.

Since the prior art processes for producing high softening-point asphalt, i.e., in excess of 200° F. require the use of a fluxing agent to prevent tower plugging, it is obvious that these processes do not lend themselves to the maximum production of charge stock for a catalytic cracking unit. Thus, in recent years, due to the demand for gasoline having a high octane value the petroleum industry has built a total capacity of some 380,000 barrels per day of coking facilities to convert asphalts and heavy fuels into a suitable feed stock for a catalytic cracking unit. Also, the petroleum refining industry has attempted to produce optimum yields of catalytic cracker charge from asphalt feeds by treatment with propane or butane to produce heavy oils and asphalts having softening points up to about 180° F. Propane treatment in this manner produces heavy oils having viscosities up to about 30 seconds Furol viscosity at 210° F. Oils of this nature and produced by propane or butane treatment are relatively low in metal content and are suitable for charging to a catalytic cracker since they do not cause appreciable poisoning of the catalytic-cracking catalyst. The preparation of a heavy asphalt from heavy reduced crude by butane treatment leaves appreciable amounts of oils having viscosities in excess of 35 seconds Furol in the asphalt fraction which act as a flux. Thus, the yield of gasoline obtainable by propane or butane treatment of heavy reduced crudes is reduced in proportion to the amount of oil heavier than 35 seconds Furol at 210° F. that is left in the asphalt, and the use of propane or butane treatment of asphalts to separate out a heavy oil suitable for catalytic cracker charge does not lend itself to maximum production of high octane gasoline. In addition to the above disadvantages of prior art propane or butane treatment to obtain oils for catalytic cracking stock and processing into high octane gasoline, the investment cost per barrel of catalytic cracker charge produced is very high when compared with solvent treatment of asphalt type bituminous material in accordance with the invention followed by Hydrofining and catalytic cracking to convert the heavy oils present in asphalt to high octane gasoline. Also, when the cost per barrel of charge stock produced by coking an asphalt to produce catalytic cracker charge is compared with the process of the invention, it is found to be at least twice as costly.

It is an object of the present invention to provide a novel method of obtaining a high softening point fraction from asphalt-type bituminous material without operational difficulties.

A further object of the present invention is to provide a novel method of separating an asphalt-type bituminous material into at least two fractions, one of the separated fractions having a softening point of at least 300° F. and being in the liquid phase.

A further object of the present invention is to provide a novel method of separating a liquid phase asphaltene fraction having a softening point of at least 300° F. from an asphalt-type bituminous material in a manner which eliminates tower plugging and permits continuous operation.

A further object of the present invention is to provide a method of separating an asphalt-type bituminous material into a plurality of liquid phase fractions, each of which possesses different physical properties due to the selectivity of the method of separation, with at least one of the separated fractions having a softening point of 300° F. or above.

A further object of the present invention is to provide a method of separating an asphalt-type bituminous material into a high-softening point fraction having low granular cohesion and a second fraction containing the maximum amount of material suitable for charging to a catalytic cracking unit after hydrofining to give an optimum yield of high-octane gasoline without experiencing severe catalyst poisoning.

These and other objects of the present invention will be apparent upon considering the following description of the present invention along with the drawings, wherein:

Figure 1 graphically illustrates pressure and temperature conditions of operation in accordance with one embodiment of the present invention;

Figure 2 diagrammatically illustrates an arrangement of apparatus suitable for continuous operation in accordance with one embodiment of the present invention;

Figure 3 graphically illustrates the manner in which the value of K, which will be defined hereinafter, varies with the softening point of the asphalt-type bituminous material to be treated when using a paraffin hydrocarbon solvent containing 5 through 8 carbon atoms, inclusive;

Figure 4 graphically illustrates the manner in which the value of K varies with the softening point of the asphalt-type bituminous material to be treated when using a mono-olefin hydrocarbon solvent containing 4 through 7 carbon atoms, inclusive;

Figure 5 graphically illustrates the manner in which the softening point of a resin fraction, after separation of an asphaltene fraction, varies with the resin separation temperature when using pentane as a solvent for separating asphalt-type bituminous material into a plurality of fractions;

Figure 6 graphically illustrates the manner in which the viscosity of asphaltic oil remaining after separation of asphaltene and resin fractions varies with the separation temperature of the resin fraction of Figure 5;

Figure 7 graphically illustrates the manner in which the color of asphaltic oil produced in accordance with the invention varies with its viscosity when using pentane as a solvent;

Figure 8 graphically illustrates the manner in which the asphaltene yield varies with the asphaltene separation temperature when using pentane as a solvent; and Figure 9 graphically illustrates the manner in which the asphaltene softening point varies with the solvent to asphalt-type bituminous material ratio when using pentane as the solvent for separating asphalt and flux charges.

The present invention resides, in part, in the discovery that at least two fractions of an asphalt-type bituminous material may be obtained, one of the fractions being a heavy insoluble fraction in the liquid phase having a softening point up to about 400° F. or higher in some instances and normally greater than about 300° F. and the other fraction being a lighter fraction dissolved in the solvent, when certain hydrocarbon solvents are employed in certain volume ratios at specific elevated temperature and pressure conditions. Since the heavy insoluble fraction, referred to herein as the asphaltene fraction, may be separated directly from the asphalt-type bituminous material in the liquid phase and this separation occurs rapidly, the process eliminates tower plugging and lends itself to continuous operation as well as batch operation.

In accordance with the present invention, included among the satisfactory hydrocarbon solvents are paraffin hydrocarbons containing from 5 through 8 carbon atoms, inclusive, mono-olefin hydrocarbons containing 4 through 7 carbon atoms, inclusive, and mixtures of the same. The term "mixtures of the same" as used in the specification and claims is intended to include a solvent comprising:

(a) Mixtures of two or more of 5 through 8 carbon atom paraffin hydrocarbons such as, for example, a mixture of iso-octane and pentane, and including mixtures of paraffin hydrocarbons having an average composite molecular weight falling within that of the 5 through 8 carbon atom paraffin hydrocarbons such as, for example, a mixture of propane or butane and octane or nonane such that the resulting mixture has an apparent density and properties for the purposes of the invention similar to those of a 5 through 8 carbon atom paraffin hydrocarbon mixture. Petroleum distillates or naphthas having an average molecular weight corresponding to the range covered by paraffin hydrocarbons having from 5 through 8 carbon atoms inclusive, such mixtures usually having a boiling point falling within the boiling range of about 80° F. to 200° F., are satisfactory solvents and fall within the term mixtures of paraffin hydrocarbons containing from 5 through 8 carbon atoms, inclusive;

(b) Mixtures of two or more 4 through 7 carbon atom mono-olefin hydrocarbons such as, for example, a mixture of iso-butylene and pentene-2, and including mixtures of mono-olefin hydrocarbons having an average composite molecular weight falling within that of the 4 through 7 carbon atom mono-olefin hydrocarbons such as, for example, a mixture of ethylene or propylene and hexylene or octylene such that the resulting mixture has an apparent density and properties for the purposes of the invention similar to those of a 4 through 7 carbon atom mono-olefin hydrocarbon mixture; and (c) Mixtures including paraffin hydrocarbon mixtures and mono-olefin hydrocarbon mixtures as defined in paragraphs (a) and (b) above.

The selection of a volume ratio of solvent to asphalt-type bituminous material is, in accordance with the present invention, critical insofar as there is a minimum solvent to asphalt-type bituminuous material volume ratio which is about 2:1. Where solvent to asphalt-type bituminous material volume ratios are less than 2:1, complete miscibility of the solvent and asphalt-type bituminous material is obtained and separation of the bituminous material into its constituent fractions becomes impossible. Increase of the volume ratio of solvent to asphalt-type bituminous material from about 2:1 to about 10:1 increases the selectivity gradually and may increase, decrease or leave unchanged the percent yield of asphaltenes depending upon the asphalt-type bituminous material being treated, the solvent, and the temperature and pressure of treatment. A volume ratio of solvent to asphalt-type bituminous material of at least about 4:1 is particularly effective and thus preferred since at volume ratios between about 2:1 and 4:1 the selectivity and yield of asphaltenes are not as good as desired in some instances. As the volume ratio is increased above 10:1, the selectivity and percentage yield remain approximately constant in most instances. Thus the selection of the volume ratio up to a value of 10:1 is determinative to some extent of the selectivity and percentage yield of asphaltenes obtained and consequently offers measures for varying the properties of the asphaltene fraction. Using volume ratios above 10:1 does not usually result in an appreciable increase of yield or selectivity and consequently use of these higher volume ratios in general is of no apparent operational advantage but may offer economic as well as operational disadvantages in some instances.

In accordance with the present invention, the minimum temperature employed in order to obtain separation of a liquid phase asphaltene fraction varies with the hydrocarbon solvent or mixture of hydrocarbon solvents employed. When the solvent is a paraffin hydrocarbon or mixture of paraffin hydrocarbons as disclosed herein, the minimum temperature of treatment must not be lower than 175° F. in order to obtain separation of a liquid phase asphaltene fraction having a softening point of about 300° F. and higher. In other words, with paraffin hydrocarbon solvents or mixtures, it is necessary to operate at or above 175° F. and at a temperature sufficient to permit a bulk interface to form between the separated asphaltene fraction and the solvent solution of the residual material or fractions. At temperatures below this level, each of the paraffin hydrocarbon solvents or solvent mixtures causes the precipitation of a fraction, but the precipitated fraction is either semi-solid or solid and it will cause tower plugging.

When using a solvent which is a mono-olefin hydrocarbon or a mixture of mono-olefin hydrocarbons as disclosed herein, the minimum temperature of treatment must not be less than 125° F., but the minimum temperature of treatment may vary somewhat with the specific solvent or solvent mixture. For example, an iso-butylene solvent requires a minimum temperature of treatment of 125° F., while the minimum temperature of treatment for a pentene-2 solvent is approximately 200° F. Expressed differently, the minimum temperature of treatment with mono-olefin hydrocarbon solvents is at least 125° F. and sufficient to permit a bulk interface to form between the separated liquid phase asphaltene fraction having a softening point of at least 300° F. and the solvent solution of residual asphalt-type bituminous material. Regardless of the hydrocarbon solvent used, the term "bulk interface" as used in the specification and claims is intended to mean the interface between two media which are liquid, with one of the media consisting of the separated liquid phase asphaltenes having a softening point of at least 300° F. and the other medium being the solvent solution of residual asphalt-type bituminous material. At temperatures below this level, each of the solvents or mixtures of solvents causes the precipitation of a fraction but the precipitated fraction is either semi-solid or solid, there being no bulk interface formed. It is understood that the bulk interface need not be necessarily a sharp line of division between the two media, since in some instances a mixture of the two media may separate an upper body of the solvent solution of residual asphalt-type bituminous material or lighter medium and a lower body of the liquid phase asphaltenes or heavy medium.

In instances where the solvent is a mixture of paraffin and mono-olefin hydrocarbons as herein disclosed, the minimum temperature of treatment for the solvent mixture will be intermediate the minimum temperatures of treatment for the individual paraffin and mono-olefin hydrocarbons making up the mixture and it will vary within this range approximately in proportion to their content in the mixture. For example, where the minimum temperatures of treatment for the paraffin hydrocarbon and mono-olefin hydrocarbon components of the solvent mixture are 175° F. and 125° F., respectively, then the minimum temperature of treatment for the mixture will be intermediate 175° F. and 125° F. and it will vary directly with the paraffin hydrocarbon content from about 125 to 175° F. For instance, in the example given above where equal amounts of the paraffin and mono-olefin solvents are present in the mixture, then the minimum temperature of treatment will fall approximately half way within the range 125–175° F., i.e., it will be about 150° F. Similarly, for solvent mixtures containing 25% paraffin hydrocarbons—75% mono-olefin hydrocarbons and 75% paraffin hydrocarbons—25% mono-olefin hydrocarbons, then the minimum temperature of treatment will be about 138° F. and 163° F., respectively.

The maximum temperature of operation for the purpose of separating a liquid phase fraction comprising the total asphaltenes of the asphalt-type bituminous material treated may be stated in a very general manner as being in the neighborhood of about 50° F. below the critical temperature of the particular solvent or solvent mixture employed. In instances where a hydrocarbon solvent mixture is employed, whether a mixture of paraffins, mono-olefins, or paraffins and mono-olefins, the critical temperature of the mixture may be determined by methods well known in the art. However, in general, the critical temperature of the mixture will be intermediate the critical temperatures of the component solvents and it will vary within this range so as to be approximately proportional to the content of the components, such as in the method described above for determining the minimum temperature of treatment for solvent mixtures. At values just above 50° F. below the critical temperature, the density change of the solvent or solvent mixture is so rapid that not only does an asphaltene fraction separate in liquid phase, but a portion of the resin content of the asphalt-type bituminous material also begins to separate.

Selection of an operating temperature between the minimum temperature of treatment set out above and in the neighborhood of about 50° F. below the critical temperature of the particular solvent or solvent mixture employed provides a convenient means for separating different liquid phase fractions of asphaltenes from the asphalt-type bituminous material. This is a particularly important feature of the present invention since it provides a method of obtaining different yields of asphaltenes from a particular asphalt-type bituminous material. Variation in the yield results in liquid fractions possessing different physical properties, e.g., asphaltenes having a softening point of at least 300° F. and considerably higher if desired. A discussion of the variation in yield with changes of temperature conditions within this range will be presented hereinafter. When operating within the aforesaid range of temperature for obtaining a liquid phase asphaltene fraction or a plurality of such fractions, it is of course essential that the pressure employed be not less than the equilibrium vapor pressure of the solvent at its temperature. Where the temperature of the solvent within a treating zone varies somewhat at spaced points, then the pressure should be at least equal to the equilibrium vapor pressure of the solvent at its highest temperature in the treating zone. Higher pressures may, however, be employed.

The percent yield of asphaltenes as a function of temperature for each of the solvents of the present invention decreases with increase in temperature, reaches a minimum, remains constant at this minimum value over a fairly wide range of temperature with some solvents, and then increases with further increasing temperature. In the case of $C_4$ paraffin hydrocarbon solvents, the temperature conditions necessary for obtaining an asphaltene fraction in the liquid phase lie on that portion of the curve in which the yield increases with an increase in temperature. Therefore, a pressure greatly in excess of the solvent equilibrium pressure is needed to prevent the separation of resins along with the separated asphaltenes, which resulting product would approximate a hard asphalt in composition as well as in gelling properties. For this reason, $C_4$ paraffin hydrocarbons are not generally satisfactory when used alone as the solvent. With $C_5$ paraffin hydrocarbon solvent, asphaltenes in the liquid phase are obtained within the range in which the percentage yield usually varies somewhat less with increasing temperature conditions than with other paraffin solvents. For example, the yield of asphaltenes obtained with isopentane when operating in this temperature range is relatively the same yield as obtained when operating at room temperature. With n-pentane, the asphaltene yield decreases somewhat with increasing temperature up to about 50° F. below the critical or about 340° F. In the case of $C_6$ paraffin hydrocarbon solvents, asphaltene precipitation in liquid phase is obtained at temperatures at which the yield is substantially constant with increasing temperature, but in order to obtain a yield which is substantially the same as that obtained with the same hydrocarbon solvent at room temperature, it is necessary to operate at temperatures approaching within approximately 50° F. of the critical temperature. With $C_7$ and $C_8$ hydrocarbon solvents, the minimum temperature conditions which must be used in order to obtain liquid phase precipitation of the asphaltenes fall on that portion of the curve in which the yield is decreasing with increasing temperature. However, in order to obtain asphaltene yields substantially the same as those obtainable at room temperature with these solvents, it is necessary to increase the temperature of operation to a value approaching approximately 50° F. below the critical temperature of the solvent.

From the above discussion and from typical data that will be presented hereinafter, it will become apparent that the $C_5$ paraffin hydrocarbons, i.e., iso-pentane and normal pentane, are the preferred paraffin hydrocarbon solvents for a number of reasons. Since the percentage yield of asphaltenes is fairly constant over a fairly wide temperature range, from approximately 175° F. to above 300° F., the choice of operating conditions is more flexible. Furthermore, when operating in this temperature range, not only is an asphaltene fraction in the liquid phase obtained, but the percentage yield is comparable with that obtainable with the same solvent when operating at room temperature. In addition, most of the known applications for asphaltenes require a product having a softening point of 300° F. or above. The asphaltene fraction obtained with a $C_5$ paraffin hydrocarbon solvent in accordance with the process of this invention has such a softening point. In this connection it is surprising that asphaltene fractions in the liquid phase and with softening points above 300° F. may be obtained while operating at temperatures of from 50 to over 200° F. below the softening point of the obtained fraction when the solvent selected is a $C_5$ paraffin hydrocarbon solvent. Another important factor leading to the selection of $C_5$ paraffin hydrocarbon solvents as preferred paraffin hydrocarbon solvents is that not only is the asphaltene fraction obtained when operating in this wide temperature range at elevated pressure of approximately the same yield as obtained with the same solvents when operating at room temperature, but the physical properties or characteristics of the asphaltenes also are essentially the same. For example, it will be observed from data presented hereinafter that the softening point of the asphaltene fraction obtained at elevated temperature and pressure with a $C_5$ paraffin hydrocarbon is the same as obtained when operating at room temperature. Not only is this true for the asphaltene fraction, but it may also be observed that the softening point and percentage yields of the resin-oil or petrolene fraction are comparable. Paraffin hydrocarbon solvents containing 5 carbon atoms are the only paraffin hydrocarbon solvents which have been found to give satisfactory yields of a liquid phase asphaltene fraction having a softening point of at least 300° F. with all types of asphalt-type bituminous material when operating at a pressure which is substantially the equilibrium pressure at a temperature of 175° F. and above. Those paraffin hydrocarbon solvents heavier than pentane disclosed herein do not normally give as large a yield of asphaltenes as pentane. With the asphalt-type bituminous materials having a softening point less than 150° F., the statement regarding lower yields with those paraffin hydrocarbon solvents heavier than pentane is particularly true when the separation temperature is within the range of 175° F. to 250° F. Further, not only is the yield of asphaltenes lower under such conditions, but the softening points of the separated asphaltenes are generally considerably higher, i.e., at least 400° F.

The preference expressed above for using $C_5$ paraffin hydrocarbon solvents when the solvent is a paraffin hydrocarbon is based primarily on the fact that the asphaltenes obtained possess a softening point of approximately 300 to 400° F. and the resins separated from the petrolene fraction have physical properties such as color which are more desirable. Present known applications for asphaltenes require such softening points. It will, however, be understood that subsequent developmental work resulting in additional uses for asphaltenes may require products of higher or lower softening points. In this case, it will become desirable to use paraffin hydrocarbon solvents within the scope of the present invention other than the $C_5$ paraffin hydrocarbons. The data presented hereinafter will illustrate the variation in softening point obtainable when using these different solvents and different solvent ratios at various temperatures.

Of the mono-olefin hydrocarbon solvents within the scope of the present invention, isobutylene is preferred for several reasons. From an economic point of view it is the least expensive and most readily available. Further, it yields a material which is comparable in its physical properties to asphaltenes separated by prior art methods, such as that described in copending application Serial Number 218,480, filed March 30, 1951. Another advantage of isobutylene is the fact that only a moderate change occurs in the yield and the softening point of the asphaltene fraction as the temperature is changed over a fairly wide range, i.e., approximately 135 to 240° F., while maintaining the pressure at about equilibrium pressure for a given temperature of treatment, or at a pressure not appreciably above equilibrium pressure. Because of these factors in isobutylene's favor, use of isobutylene instead of the other mono-olefin hydrocarbon solvents included within the scope of the present invention permits a more flexible choice of operating conditions and obtains an asphaltene fraction in the liquid phase having a softening point of at least 300° F.

The residual or petrolene fraction dissolved in the selected hydrocarbon solvent may be separated from the solvent by flashing and thus produce a product having properties useful, for example, in the paint, varnish and enamel industries. If, however, it is desirable to recover separate fractions of oils and resins, it is possible, in accordance with the present invention, to obtain such fractions by increasing the prevailing temperature conditions of the petrolene fraction dissolved in the hydrocarbon solvent.

In order to recover the resin fraction or a portion thereof from the petrolenes in solution, it is simply necessary to increase the temperature above approximately 50° F. below the critical temperature of the hydrocarbon solvent or solvent mixture while maintaining the pressure at a value at least equal to the vapor pressure of the solvent.

Surprisingly, the critical temperature of the hydrocarbon solvent is not the maximum temperature at which the resin fraction may be recovered in the liquid phase from the petrolenes in hydrocarbon solution. As a matter of fact, I have discovered that temperatures appreciably in excess of the critical temperature of the hydrocarbon solvent may be employed for separating the resin fraction in liquid phase from the petrolenes in hydrocarbon solvent solution while leaving the oils in solution, providing the pressure employed is of the proper choice. The upper limit of operative temperature is that at which decomposition of the hydrocarbon solvent or the asphalt-type bituminous material begins to take place.

The foregoing discussion sets forth desirable conditions of operation for the separation of desired fractions from asphalt-type bituminous material in accordance with the present invention in a simple but very general manner. This discussion should be thought of as defining the conditions of operation in a convenient and practical manner which may be readily understood by relatively unskilled personnel operating a plant. A more accurate way of determining the optimum temperatures and pressures necessary for the separation of desired liquid phase fractions from asphalt-type bituminous material is based on the solvent density necessary to separate a given liquid phase fraction.

As stated hereinbefore, where a paraffin hydrocarbon solvent or solvent mixture is used, the temperature range for the purpose of separating a liquid phase fraction of asphaltenes having a softening point of 300° F. or higher is between 175° F. and at least sufficient to permit a bulk interface to form between the separated fraction and the solvent solution, and approximately 50° F. below the critical temperature of the specific hydrocarbon solvent used.

In instances where the hydrocarbon solvent is a mono-olefin hydrocarbon or mixture, the temperature range for the purpose of separating a liquid phase fraction of asphaltenes is between a temperature of at least 125° F. and sufficient to permit a bulk interface to form between a separated liquid phase asphaltene fraction having a softening point of at least 300° F. and the solvent solution of residual asphalt-type bituminous material, and approximately 50° F. below the critical temperature of the specific solvent used. The pressure employed when operating under the above temperature conditions is not less than the equilibrium vapor pressure of the hydrocarbon solvent at its temperature. A much more accurate determination of the maximum temperature for the separation of a liquid phase fraction of asphaltenes having a softening point of 300° F. or higher is based on the solvent density range for the hydrocarbon solvent which is necessary for separation of such an asphaltene fraction. The solvent density is expressed hereinafter in the specification and claims in grams per cubic centimeter (g./cc.).

The solvent density range for obtaining a good yield of a liquid phase asphaltene fraction having a softening point of at least 300° F. varies with the specific hydrocarbon solvent and the softening point of the given asphalt-type bituminous material to be separated. The solvent density necessary to give an optimum yield of asphaltenes having a softening point of at least 300° F. is lower for a high softening point asphalt-type bituminous material than for a lower softening point one. When using a paraffin hydrocarbon solvent, the difference in solvent density necessary to obtain separation of asphaltenes having essentially the same softening point is about 0.05 density unit for asphalt-type bituminous material having softening points of 100° F. and 200° F. For example, pentane gives excellent yields of asphaltenes of at least 300° F. softening point within the pentane solvent density ranges of 0.44 to 0.50 and 0.39 to 0.45 with asphalts having softening points of 100° F. to 200° F., respectively. In fact, these pentane solvent density ranges may be considered the preferred operating densities for pentane separation of liquid phase asphaltenes.

Those paraffin hydrocarbon solvents higher in molecular weight than pentane have such high densities at 175° F. that the asphaltenes separated from low softening point asphalt-type bituminous material are normally very high in softening point, i.e., in the neighborhood of 400° F. and as a consequence the yield of asphaltenes is very low. With asphalts having softening points of 150° F. to 200° F., the yield of asphaltenes is considerably improved. Therefore, to obtain an optimum yield of asphaltenes, of at least 300° F. softening point when using paraffin hydrocarbon solvents, the temperature will need to be higher than 175° F. to reduce the density of those solvents heavier than pentane to the preferred density range. Pentane gives excellent yields of asphaltenes at 175° F. on both the soft and hard asphalts.

When isobutylene is the solvent used for treating asphalts having softening points of 117° F. and 195° F., the minimum asphaltene separation density is about 0.50 and 0.42 g./cc., respectively. Those mono-olefin hydrocarbon solvents higher in molecular weight than isobutylene have such high densities at 125° F. that the asphaltenes separated from low softening point asphalt-type bituminous material are normally very high in softening point, i.e., in the neighborhood of 400° F., and as a consequence the yield of asphaltenes is very low. In some instances, no yield is obtained since the mono-olefin hydrocarbon solvent and asphalt-type bituminous material are completely miscible. However, when an asphalt having a softening point of 150° to 200° F. is separated, the yield of asphaltenes may be considerably improved. Therefore, to obtain an optimum yield of asphaltenes of at least 300° F. softening point, the temperature should be higher than 125° F. so as to reduce the density of those mono-olefin hydrocarbon solvents heavier than isobutylene to the preferred density range. Isobutylene gives excellent yields of asphaltenes at 125° F. when both hard and soft asphalts are separated.

Regardless of the hydrocarbon solvent, the maximum density for obtaining the separation of asphaltenes is a solvent density less than that solvent density at which no liquid phase separation of asphaltenes occur, i.e., a solvent density sufficient low so as to prevent the hydrocarbon solvent and asphalt-type bituminous material from becoming completely miscible. For example, at a 10:1 solvent to asphalt-type bituminous material ratio, heptylene is completely miscible at 200° F. with an asphalt having a softening point of 117° F. The density of heptylene at this temperature is 0.62 g./cc. and, therefore, a heptylene density of 0.62 g./cc. is in excess of the maximum asphaltene separation density.

A preferred method of determining the minimum solvent density at which an optimum yield of asphaltenes having a softening point of 300° F. is obtained is by means of the following equation:

$$d=\frac{K}{\sqrt{MW}}$$

where $d$ is the solvent density in grams per cc., $K$ is a constant for the paraffin or mono-olefin hydrocarbon solvent whose numerical value varies according to the softening point of the asphalt-type bituminous material being treated and $\sqrt{MW}$ is the square root of the molecular weight of the specific hydrocarbon solvent or solvent mixture used. The specific value of K used in the foregoing equation is dependent upon whether paraffin hydrocarbons, mono-olefin hydrocarbons, or a mixture of paraffin and mono-olefin hydrocarbons are used as the solvent, and to some extent upon the softening point of the asphalt-type bituminous material.

The value of K for paraffin hydrocarbon solvents may be determined by reference to Figure 3 of the drawings. Upon reference to Figure 3 of the drawings, it will be seen that the value of K for paraffin hydrocarbon solvents decreases with an increase in the softening point of the asphalt-type bituminous material. For example, the value of K is 4.1 and 3.5 for asphalt-type bituminous materials having softening points of 100° F. and 195° F. respectively. When mixtures of the paraffin hydrocarbons, mono-olefin hydrocarbons, or paraffins and mono-olefins are used as the solvent, the ASTM method for calculating the molecular weight of petroleum distillates may be used to determined the average molecular weight of the solvent mixtures.

For those asphalt-type bituminous materials most readily available from refinery crude processing and when using paraffin hydrocarbon solvents, K has the value of 4.0±0.2 but, in general, the values of K of about 3.5 to 4.3 cover those asphalt-type bituminous materials normally encountered from both native and pyrogenous sources. With multiple stage countercurrent treating systems, it may be necessary to use the density values obtained when K for paraffin hydrocarbon solvents is about 3.3 to 4.0. Normally K values of 3.5 to 4.0 will be suitable for the asphalts obtained by vacuum distillation when using paraffin hydrocarbon solvents.

Table I illustrates solvent density values calculated from the equation $$d=\frac{K}{\sqrt{MW}}$$

where K has values of 5.8, 4.0 and 3.5, respectively, for paraffin hydrocarbons having from 3 to 9 carbon atoms. The K value of 5.8 for paraffin hydrocarbons corresponds to those density values at temperatures in excess of 175° F. where the yield of asphaltenes from an asphalt of about 120° F. softening point is small or negligible due to the approaching miscibility of the asphalt and solvent. The asphaltenes obtained at these density values may be of extremely high softening point and not readily determinable by the ASTM procedure. The upper range of density values at which asphaltenes are obtainable is less than the density value at which the asphalt and solvent are mutually miscible.

TABLE I

| Hydrocarbon | Molecular Weight | $\sqrt{\text{Molecular Weight}}$ | Calculated Densities | | |
|---|---|---|---|---|---|
| | | | K—5.8 | K—4.0 | K—3.5 |
| Propane | 44 | 6.64 | 0.874 | 0.604 | 0.526 |
| Butane | 58 | 7.62 | 0.762 | 0.539 | 0.472 |
| Pentane | 72 | 8.48 | 0.685 | 0.473 | 0.413 |
| Hexane | 86 | 9.27 | 0.626 | 0.432 | 0.378 |
| Heptane | 100 | 10.00 | 0.580 | 0.400 | 0.350 |
| Octane | 114 | 10.77 | 0.540 | 0.372 | 0.325 |
| Nonane | 128 | 11.31 | 0.513 | 0.352 | 0.309 |

When using paraffin hydrocarbon solvents and operating within the foregoing solvent density ranges at elevated temperature and pressure, it is apparent that the temperature and pressure of the system must be so adjusted as to give the proper solvent density. Thus the pressure employed will not be less than the equilibrium vapor pressure of the particular paraffin hydrocarbon solvent at its temperature, and sufficiently high to obtain a solvent density falling within the solvent density range for the specific solvent. The temperature employed will be at least 175° F. and sufficiently high to give a solvent density falling within the solvent density range for the particular paraffin hydrocarbon solvent used.

When pentane is the solvent, an asphaltene fraction having a softening point of at least 300° F. is obtained in optimum yield at temperatures greater than 175° F. and at solvent densities of 0.45 to 0.50, the particular softening point and percent yield obtainable being dependent on the solvent to asphalt-type bituminous material ratio. In general, a solvent to asphalt-type bituminous material ratio of at least 4:1 is preferred and ratios as high as 20:1 are utilized with the novel solvent recovery method wherein solvent is phased out of the oils at a solvent density less than 0.23. For other paraffin hydrocarbon solvents, the same ratio of solvent to material treated is preferred, but the optimum solvent density changes somewhat. For example, optimum yields of asphaltenes with paraffin hydrocarbon solvents lighter than pentane are obtained at slightly higher solvent densities than is true of pentane, while with paraffin hydrocarbon solvents heavier than pentane densities slightly lower than with pentane are preferred. The paraffin hydrocarbon solvents containing 5 carbon atoms are preferred over other paraffin hydrocarbon solvents disclosed herein since all types of asphalt-type bituminous material may be treated to obtain higher yields than is generally true with the other solvents.

By referring to Figure 4 of the drawings, it will be seen that the value of K for mono-olefin hydrocarbon solvents decreases with an increase in the softening point of the asphalt-type bituminous material. For example, K for mono-olefin hydrocarbon solvents has a value of about 3.2 for hard asphalts having softening points of 175° F. and higher, while asphalts having a softening point of 110–120° F. have K values of about 3.7 to 3.9. For fluid to semi-soft asphalt-type bituminous substances, K for mono-olefin hydrocarbon solvents may have values up to about 4.5. The density values for mono-olefin hydrocarbon solvents obtained when K has values of 3.5 to 4.0 represent preferred solvent densities at which optimum yields of asphaltenes having a softening point of at least 300° F. are obtained when using mono-olefin solvents and operating on asphalt-type bituminous materials obtained from most refinery operations.

Table II below gives solvent density values for various mono-olefin hydrocarbon solvents as calculated by the above equation when K is 3.8, i.e., a value typical for 117° F. softening point vacuum reduced asphalt.

TABLE II

| Olefin | Molecular Weight | Square Root of Molecular Wt. | Calculated Densities, g./cc. |
|---|---|---|---|
| Propylene | 42 | 6.48 | 0.59 |
| Butene | 56 | 7.48 | 0.50 |
| Pentene | 70 | 8.36 | 0.45 |
| Hexene | 84 | 9.16 | 0.41 |
| Heptene | 98 | 9.90 | 0.39 |
| Octene | 112 | 10.58 | 0.36 |
| Nonene | 126 | 11.23 | 0.34 |

When asphalt-type bituminous materials and a mono-olefin hydrocarbon solvent having more than five carbon atoms are heated with agitation to an elevated temperature, i.e., 150–250° F., the solvent and asphalt-type bituminous material usually are completely miscible. However, if the heating is continued past the temperature at which the solvent is completely miscible with asphalt-type bituminous material, separation of an asphaltene fraction will occur providing the pressure is adjusted to obtain a solvent density less than the maximum asphaltene separation density and greater than the minimum solvent density set forth above for mono-olefin hydrocarbon solvents. If the solvent density for the mono-olefin hydrocarbon solvent is greater than the minimum solvent density set forth above, but less than the maximum asphaltene separation density, then the asphaltene fraction which is separated will have a softening point of 300° F. or higher. As the molecular weight of the mono-olefin hydrocarbon solvent increases past about 7 or 8 carbon atoms, the minimum heavy fraction separation density is close to the critical density and the separation conditions become difficult to control and for most purposes continuous operation is impractical.

When operating within the foregoing solvent density ranges for mono-olefin hydrocarbon solvents at elevated temperature and pressure, it is apparent that the temperature and pressure of the system must be so adjusted as to give the proper solvent density. Thus, the pressure employed will not be less than the equilibrium vapor pressure of the specific solvent at its temperature, and sufficiently high to obtain a solvent density falling within the solvent density range for the specific mono-olefin hydrocarbon solvent. The temperature employed will be at least 125° F. and sufficiently high to give a solvent density falling within the solvent density range for the specific mono-olefin hydrocarbon solvent used, as well as to insure that the separated asphaltene fraction will be in the liquid phase.

When isobutylene is the mono-olefin hydrocarbon solvent, an asphaltene fraction having a softening point of at least 300° F. is obtained to optimum yield at temperatures greater than 125° F. and at solvent densities of 0.43–0.55, the specific softening point of the separated asphaltene fraction and percent yield obtainable being somewhat dependent on the solvent to asphalt-type bituminous material ratio. In general, an isobutylene to asphalt-type bituminous material ratio of at least 4 to 1 is preferred but ratios as high as 20 to 1 are utilized in some instances. For other mono-olefin hydrocarbon solvents, the same ratio of solvent to material treated is preferred, but the optimum solvent density changes somewhat. For example, optimum yields of asphaltenes with mono-olefin hydrocarbon solvents heavier than isobutylene are obtained at solvent densities slightly lower than those used with the preferred mono-olefin hydrocarbon solvent isobutylene.

In instances where the solvent is a mixture of paraffin and mono-olefin hydrocarbons, the value of K and the solvent density for a given solvent mixture may be determined from the values of K or the solvent density values for the component solvents in a manner analogous to the method discussed hereinbefore for determining the minimum temperature of treatment for mixtures. For example, the values of K for paraffin hydrocarbon solvents giving preferred calculated density values are 3.5 to 4.3, while the values of K for mono-olefin hydrocarbon solvents giving preferred calculated density values are 3.2 to 3.8. Thus, the values of K giving preferred density values for any mixture of paraffin and mono-olefin solvents will be higher than 3.2 and less than 4.3, while the lower limit for a satisfactory range of values for K will be between 3.2 and 3.5, and the upper limit for a satisfactory range of values for K will be between 3.8 and 4.3. It also is apparent that the minimum value of K will vary directly and the maximum value of K will vary indirectly with the paraffin hydrocarbon content of the solvent mixture. For instance, when the solvent is a 50–50 mixture of paraffin and mono-olefin hydrocarbons, the minimum value of K will be approximately 3.4 and the maximum value approximately 4.1. Similarly, for mixtures containing 75 parts of paraffin hydrocarbon—25 parts of mono-olefin hydrocarbon and 25 parts of paraffin hydrocarbon—75 parts of mono-olefin hydrocarbon, the minimum value of K will be about 3.4 and 3.3 respectively; while the corresponding maximum values of K will be about 4.2 and 3.9, respectively. The minimum and maximum solvent density values for these solvent mixtures may be readily calculated by substituting the foregoing values of K in the formula $$d = \frac{K}{\sqrt{MW}}$$

Once a liquid phase asphaltene fraction has been separated from the asphalt-type bituminous material at solvent densities within the above ranges, the temperature and pressure of the residual petrolene fraction are then adjusted to obtain a solvent density less than the minimum solvent density necessary for the separation of asphaltenes and greater than 0.23. Thus, the hydrocarbon solvent density is adjusted to give a density less than the density indicated by the equation $$d = \frac{K}{\sqrt{MW}}$$

and greater than 0.23. The resulting liquid phase resin fraction then may be separated while in the liquid phase without danger of tower plugging even though the softening point may be 175° F. to 200° F. and even higher.

In the case of operating below the critical temperature but within the neighborhood of 50° F. thereof to separate a resin fraction, the pressure employed must not be less than the vapor pressure of the hydrocarbon solvent at the temperature selected. In addition, the pressure employed should be such as to maintain a solvent density less than the minimum asphaltene separation density and greater than a density of about 0.23 g./cc. In the case of temperature conditions exceeding the critical temperature of the hydrocarbon solvent, the pressure employed for a given temperature must not be less than the value obtained by extrapolating the vapor pressure curve in accordance with the Cox vapor pressure chart using water as a reference substance. Extrapolation of the vapor pressure of a given hydrocarbon solvent in accordance with the Cox vapor pressure chart using water as a reference substance determines the minimum pressure that may be employed at a temperature above the critical temperature of the hydrocarbon solvent when obtaining resins as a separate liquid phase from the residual petrolenes dissolved in hydrocarbon solvent.

The construction of a Cox vapor pressure chart using water as a reference substance is understood by those skilled in the art. Briefly, from a mathematical viewpoint, vapor pressure should be related to temperature as follows:

$$\text{Log } P = \frac{-A}{T} + B$$

where P is the pressure, T is the boiling point and A and B are constants. Cox found that if a constant is added to the temperature term of this equation, a straight line plot results on semilogarithmic graph paper. Such a method of plotting is widely used, and one common empirical formula is:

$$\text{Log } P = \frac{-A}{T+382} + B$$

where T is the boiling point in degrees Fahrenheit at pressure P, and A and B are constants.

Now if we construct a vapor pressure curve for water by plotting pressure as the ordinate on a logarithmic scale and temperature as the abscissa, a straight line vapor pressure curve may be obtained by selecting an arbitrary scale for the temperature values corresponding to specific vapor pressures at these temperatures. Utilizing the temperature scale arbitrarily selected for providing a straight line vapor pressure curve for water, and using the same logarithmic scale for pressure values, Cox found that the vapor pressure curves of hydrocarbon solvents, among other solvents, also may be plotted and that the resulting curves are straight lines. Values for plotting these straight line vapor pressure curves for the hydrocarbon solvents may be determined by known temperature–vapor pressure relationships at temperatures below the critical. This straight line may be extrapolated to temperatures beyond the critical temperature of the solvent and the result is an extrapolation of the vapor pressure curve in accordance with the Cox vapor pressure chart using water as a reference substance. An example of such extrapolations for the solvents of the present invention may be found in the Sixth Edition of the Engineering Data Book of the Natural Gasoline Supply Men's Association, Tulsa, Oklahoma, 1951. The particular chart occurring therein is a Cox vapor pressure chart constructed by Norman K. Rector. For the hydrocarbon solvents of the present invention, the Cox vapor pressure chart extrapolation by the method of Rector gives lines of essentially constant density having a numerical density value of approximately 0.23 g./cc. The numerical density value of 0.23 g./cc. corresponds to the critical density value of the hydrocarbon solvents of the present invention.

With reference to Figure 1, there is illustrated a vapor pressure curve for normal pentane as extrapolated from data obtained from a Cox vapor pressure chart, the particular chart from which these data were obtained being that referred to above as constructed by Norman K. Rector. The following tabulated data as obtained from Norman K. Rector's chart were used for plotting the curve of Figure 1:

| Temperature, °F.: | Vapor pressure, p.s.i.a. |
|---|---|
| 150 | 37.0 |
| 175 | 52.5 |
| 200 | 75.0 |
| 250 | 136 |
| 300 | 230 |
| 350 | 360 |
| 386 [1] | 470 |
| 400 | 525 |
| 425 | 625 |
| 450 | 750 |

[1] Critical temperature.

By separating the resin fraction or a portion thereof by operation at temperature conditions above approximately 50° F. below the critical temperature and at pressure conditions hereinbefore defined, the resin fraction may be withdrawn in the liquid phase from the separation zone leaving the oil content or fraction of the asphalt-type bituminous material in solution in the hydrocarbon solvent. A convenient means for recovering the oil from the hydrocarbon solvent subsequent to the separation of the resin fraction is by simple flashing of the solvent followed, if necessary, by distillation to remove any residual solvent retained by the oil.

Preferably, however, in accordance with the present invention, recovery of the oil or any residual fraction such as a mixture of oils and resins is obtained by maintaining the pressure of operation used in separating the last fraction and simply increasing the temperature to a value above the equilibrium temperature of the solvent at the prevailing pressure. By "equilibrium temperature" as used here and in the claims is meant, at temperatures below the critical, the actual saturation temperature of the solvent, for the pressure in question and, at temperatures above the critical, the temperature corresponding to the prevailing pressure as determined by a Cox vapor pressure curve extrapolation using water as the reference substance. By this preferred means of separation, a major proportion of the heat content of the separated solvent may be recovered by heat exchange against a solvent-rich phase of any previous fraction resulting from the removal of constituents of the asphalt-type bituminous material and the solvent then may be used in the process, for example, as feed to the first fractionating stage where a high pressure solvent is required.

The following is a description of a process scheme for continuous operation in the separation of a liquid phase asphaltene fraction, a liquid phase resin fraction, and an oil fraction from an asphalt-type bituminous material. While normal pentane as a solvent is referred to in the description below for purposes of illustration, it is understood that the solvent may consist essentially of one or more paraffin hydrocarbons containing 5 through 8 carbon atoms inclusive, one or more mono-olefin hydrocarbons containing 4 through 7 carbon atoms inclusive, and mixtures of the above paraffin and mono-olefin hydrocarbon solvents. Also, as will be apparent to those skilled in the art, the process is amenable to batch operation if desired or to a special operation to make catalytic cracker stock.

With reference to Figure 2 of the drawings, 291.7 barrels per hour of normal pentane at a temperature of 250° F. flow from solvent container 10 via line 12 and are mixed in venturi mixer 14 with 29.2 barrels per hour of asphalt at a temperature of 300° F. which is being pumped from reservoir 16 via line 18. This mixture of normal pentane and asphalt then is introduced into equilibrium vessel 20 at a pressure of 525 p.s.i.g. and a temperature of 250° F. The primary function of the equilibrium vessel 20 is to allow the asphaltene phase to separate completely from the solution of petrolenes and vice versa. The size of the vessel is selected to permit the necessary residence time for complete separation. The asphaltene phase under equilibrium temperature and pressure conditions possesses a viscosity comparable to that of heavy molasses. Because it has this degree of fluidity, it is capable of flowing from the bottom of the equilibrium vessel via line 22 to an asphaltene storage tank 24. In place of passing directly to storage tank 24, the asphaltene fraction preferably is passed to a heated vessel in which it is raised to a temperature of, for example, 500° F. at atmospheric pressure. The purpose of this heating is to remove the last traces of solvent from the asphaltenes. The solvent recovered here may be recycled in the process. It has been found that approximately 0.6 of a volume of solvent is incorporated in each volume of asphaltene fraction separated. In the case of the present example 9.4 barrels per hour of a liquid asphaltene-solvent phase including 3.5 barrels per hour of pentane are removed via line 22.

The rate of removal of the asphaltene-solvent liquid phase from the equilibrium vessel 20 may be controlled by a liquid level controller within the vessel. This would normally actuate a motor diaphragm valve in line 22.

It is necessary that the pressure in separating vessel 20 be at least as great as the vapor pressure of the solvent employed at the temperature of operation. If the pressure is less than the equilibrium vapor pressure, no separation will occur.

Removal from equilibrium vessel 20 of the solvent solution of petrolenes through line 26 by pump 28 may be conveniently controlled by pressure control means 30 operating a valve 32. By this method of removal, the rate of removal from the equilibrium vessel will be automatically controlled so as to be commensurate with the rate of their production in accordance with the relative rates at which the asphalt-type bituminous material and the pentane solvent are fed to the mixer 14 and thence to the equilibrium vessel 20.

The solvent-rich phase containing petrolenes in solution, after being removed as aforesaid through controlled means, is pumped through heat exchangers 34 and 36 arranged in series in which it is heated to a temperature of 382° F. by a counter flowing stream of recovered pentane solvent as hereinafter described.

The resulting solvent-rich phase containing petrolenes which is now at a temperature of 382° F. and a pressure of 525 p.s.i.g. is then introduced via line 38 into a second equilibrium vessel 40 whose primary function is to allow the resin phase to separate completely from the solution of oil in pentane solvent. The size of this vessel is so adjusted as to permit the necessary residence time for complete separation. The resins are separated in the liquid phase and are withdrawn from the bottom of the equilibrium vessel 40 via line 42 into resin storage vessel 44. The rate of removal of the resin-solvent liquid phase from the equilibrium vessel 40 may also be controlled by a liquid level controller within the vessel. The solvent-rich solution of oils in pentane are removed from the equilibrium vessel 40 via line 46. The rate of removal of this solvent-rich solution also may be controlled conveniently by a pressure controller operating a valve in line 46. In this way, the rate of removal of the resin-solvent liquid phase and the solvent-rich solution of oils from the equilibrium vessel will be automatically controlled and will be commensurate with the rate of production in accordance with the rate at which the solvent-rich petrolene containing stream is fed to equilibrium vessel 40.

The resin-solvent liquid phase withdrawn from equilibrium vessel 40 at the rate of 14.9 barrels per hour including 5.6 barrels per hour of pentane solvent may be fed if desired to a gas-fired separation vessel for the removal of the solvent content thereof. Elevation of the temperature of the resin-solvent liquid phase to 500° F. at atmospheric pressure, for example, will cause complete separation of the pentane solvent. This recovered solvent may be recycled in the process.

The pentane-rich fraction containing oils is removed from equilibrium vessel 40 via line 46 at the rate of 296.6 barrels per hour and at a temperature of 382° F., and heated to a temperature of 420° F. in heat exchanger 48. Heat exchanger 48 may conveniently be a gas-fired heater.

The heated solvent-rich stream of oils and pentane is fed to a third equilibrium vessel 50 whose primary function is to permit complete separation of the oils and pentane solvent. The size of this vessel therefore is adjusted so as to permit the necessary residence time for complete separation. The separated oil-solvent phase is withdrawn via line 52 to an oil storage vessel 54 at the rate of 22.4 barrels per hour including 8.40 barrels per hour of pentane, as shown in Figure 2. Rather than store this mixture of oils and pentane, the mixture may be fed to a tower packed with Raschig rings and the pentane content stripped by means of dry steam. The recovered solvent then may be recycled in the process, if desired.

Pentane in an amount of 274.17 barrels per hour and at a temperature of 420° F. and a pressure of 525 p.s.i.g. flows via line 56 through heat exchangers 36 and 34 to still another heat exchanger 58. In order to obtain a temperature of 382° F. in the solvent-rich stream flowing through line 38, the amount of pentane flowing through exchangers 36 and 34 is controlled by a valve in by-pass line 60. In heat exchanger 58 which is water cooled, the pentane solvent reaches a temperature of approximately 258° F. and then is passed via line 62 to solvent storage tank 10 to provide a supply of pentane at a temperature of approximately 250° F. for further use in the process.

The foregoing description of a scheme for continuous operation of the present operation has been based upon constant pressure operation. For the purpose of visualizing this process reference now should be had to Figure 1. In Figure 1, the dot-dash line represents pressure and temperature conditions under which the above processing scheme is operated. Point A represents temperature and pressure conditions for separation of the asphaltene fraction in equilibrium vessel 20, point B represents the pressure and temperature conditions for separation of the resin fraction in equilibrium vessel 40, and point C represents temperature and pressure conditions used for separation of the oil fraction in the equilibrium vessel 50. It is, however, not necessary to operate at constant pressure for the purpose of separating various fractions of an asphalt-type bituminous material in accordance with the present invention. For example, and again referring to Figure 1, in place of operating equilibrium vessel 20 at 525 p.s.i.g. for obtaining an asphaltene fraction in the liquid phase, a pressure of 125 p.s.i.g. and a temperature of 250° F. may be used. Such conditions are shown graphically in Figure 1 wherein the dotted line illustrates the separation at point A' of the asphaltenes under these temperature and pressure conditions and the further separation of the resins at point B and the oils at point C. It will of course be understood that different pressures of separation could be used for each of equilibrium vessels 20, 40 and 50.

The above description of a scheme for continuous operation in accordance with the process of the present invention recovers the heat content of the essentially pure pentane solvent flowing in line 56 by heat exchange against a solvent-rich fraction containing petrolenes as obtained by the separation in equilibrium vessel 20. It is not, however, necessary that the heat content of the essentially pure pentane flowing in line 56 be recovered in this manner. If pentane at a temperature of 420° F. and a pressure of 525 p.s.i.g. were desirable elsewhere in the plant, the solvent-rich fraction flowing in line 26 could be heated by other means. In addition, it would be possible to utilize the heat content of stream 56 for increasing the temperature of the solvent-rich fraction flowing in line 46 almost to that value required for separation in equilibrium vessel 50, the additional heat required for this separation being supplied by other means, Actually, the choice of the particular level at which the heat content of the pentane solvent in line 56 may or may not be recovered is a question of economics and depends upon the temperature and pressure operating conditions in the various fractionating zones, as will be appreciated by those skilled in the art.

In accordance with the present invention, it is possible to obtain a high softening point asphaltene fraction by treating the asphalt-type bituminous material in a single treating zone using the solvents and conditions taught therein. Thus, a substantially pure asphaltene fraction may be withdrawn directly from a single treating vessel and further treatment such as solvent washes is not necessary. Where the term single treating zone is used in the specification and claims, it is understood that the term is not limited to a zone within a vessel which is formed, for example, by plates or other contacting means.

Although substantially pure mono-olefin hydrocarbon solvents containing from 4 through 7 carbon atoms inclusive, are satisfactory solvents for the present invention, their homologue, substantially pure propylene, is not. When treating a 117° F. softening point, 87 penetration at 77° F., vacuum reduced asphalt with propylene as the solvent with a solvent to material ratio of 10:1, the precipitated phase at a temperature of 179° F. and a pressure of 430 p.s.i.g. was liquid but had a softening point of 163° F., the yield being 76.8% of the weight of asphalt treated. Thus an essentially asphaltene phase was not obtained under these conditions. Instead a mixture of asphaltenes and resins was obtained. Attempts to use substantially pure mono-olefin solvents containing more than 7 carbon atoms were unsuccessful due, in part, to the instability of the solvent at the necessarily high operating temperatures. For example, when using substantially pure mono-olefin solvents containing more than 7 carbon atoms, it is necessary to operate at a temperature near the critical temperature of the particular solvent. At such elevated temperature, excessive polymerization of the solvent takes place, and other adverse factors are introduced.

Since the degree of separation obtained for any fractionating stage is somewhat dependent upon the solvent to asphalt-type bituminous material volume ratio, as will be illustrated in the examples presented hereinafter, the scope of the present invention includes variation of the solvent ratio in any fractionating stage, particularly intermediate fractionating stages, for the purpose of obtaining different fractions of separated material. Thus, the pentane solvent flowing in line 56, although shown in Figure 2 to be eventually returned to the first fractionating stage, may in turn have a portion thereof returned to intermediate fractionating stage 40, for example, for varying the solvent ratio.

The asphalt-type bituminous material used as feed for the process of the present invention should contain more than a trace amount and, preferably, a substantial amount of asphaltenes. For example, the asphaltene content should be at least sufficient to cause tower plugging when attempting to separate a high softening point fraction having a softening point of at least 300° F. following prior art practice. In most instances, at least about 1% asphaltenes should be present and, preferably, not less than about 5%. However, it should be remembered that tower plugging has been reported as occurring with some crude asphalts containing less than 1% asphaltenes during propane treatment and the present invention is equally effective in preventing tower plugging when the feed contains 1% or less asphaltenes.

It is not always necessary in accordance with the present invention to first distill off lighter fractions from crude before separation into desired fractions such as asphaltenes, resins, and oils. For examples, Mississippi asphalt-type crude may be separated directly by the method of the invention into an asphaltene fraction having a softening point of 300° F. or higher, a resin fraction, and an oil fraction which contains the lighter fractions such as gasoline, kerosene, gas oil, etc. The oil fraction thus obtained may be readily separated by distillation into the above mentioned lighter fractions and heavier oil fractions in their usual yields.

To further illustrate the flexibility of the invention and its suitability for processing asphaltic materials to produce various specialty products which were not available commercially heretofore, various special operations of the plant illustrated in Fig. 2 will be discussed. There has long been a demand for a powdered bituminous material which exhibits low granular cohesion for building roads and other soil surface treatments such as waterproofing banks of canals, etc. The only powdered asphaltic materials available commercially have been blown asphalts. Blown asphalts, instead of exhibiting the property of low granular cohesion, exhibit the property of high granular cohesion. For example, a blown asphalt when ground has the appearance of powdered graphite or magnetized iron filings since the particles tend to cohere instead of existing as separate and distinct particles.

The high granular cohesion type powdered bituminous materials are particularly undesirable for treating sand to obtain a water impervious composition or mixture since cohesion of the particles aggravates the problem of obtaining intimate admixture with the sand. On the other hand a low granular cohesion powdered bituminous material, such as is obtainable by the operation of the plant shown in Fig. 2 in accordance with the invention, may be readily and uniformly mixed with sand to obtain a water impervious mixture. Further, the intimate mixtures of sand and low granular cohesion bituminous materials exhibit the peculiar phenomenon of being non-water-wettable even when placed under a hydraulic head of water. Thus, the operation of the plant shown in Fig. 2 in accordance with the teachings of the invention produces in commercial quantities a material which has exceptional properties for cold treatment of soils to obtain surfaces which are essentially porous yet water-impervious and at a price that is competitive with blown asphalts.

A further advantage of the flexibility of the invention is illustrated by a method of making very high softening-point asphaltenes, i.e., in excess of 350° F. and simultaneously therewith producing an asphaltene-resin fraction which has low granular cohesion and improved pigment response. Such an asphaltene-resin fraction is very desirable for use in making colored asphalt tile products, as it may be easily incorporated in the tile composition and has relatively low pigment requirements. When operating in accordance with this embodiment of the invention, drum 20 of Fig. 2 is maintained within about 50 to 65° F. below the critical temperature of the solvent. With pentane as the solvent, the temperature will be about 320 to 337° F. The yield of asphaltenes will vary from about 2% to 10% depending upon the nature of the charge and the softening point of the asphaltenes will vary from 340° F. upward depending upon the solvent-to-charge ratio.

Under the above operating conditions for drum 20, part of the asphaltenes may not be separated and pass to drum 40 of Fig. 2. Drum 40 is maintained at a temperature within 50° F. of the critical temperature of the solvent. Hence, when pentane is the solvent, the operating temperature of drum 40 may be about 350 to 375° F. Under these operating conditions, a resin-asphaltene fraction having low granular cohesion and improved pigment response will separate and pass to storage tank 44. The asphaltene-resin fraction separated from drum 40 under the above conditions has a softening point depending upon the temperature of separation, the charge to drum 20 and the solvent-to-charge ratio. The asphaltene-resin fraction will be essentially free of oil.

The material passing overhead from drum 40 via line 46 and heater 48 to drum 50 contains asphaltic oil and solvent. Since the temperature of the product passing overhead from drum 40 is adjusted by heater 48 to above the critical temperature, the pressure is less than the equilibrium pressure and the oil separates out in drum 50 and passes to storage tank 54. The solvent passes overhead from drum 50 to solvent storage via line 56.

As the temperature in drum 20 approaches the upper temperature limit for the separation of asphaltenes, progressively lower percentages of asphaltenes are separated until at a temperature of 50° F. below the critical temperature the yield of asphaltenes from drum 20 may be only 1 to 2%. This phenomenon permits the petroleum refiner to adjust the yield of products produced from the plant of Fig. 2 to meet changing market conditions. Thus, it may be expedient to operate the plant shown in Fig. 2 to produce only 1 or 2% or even less asphaltenes while producing a high yield of oil-free asphaltene-resin fraction having low granular cohesion and improved pigment response. It is especially desirable to operate in this manner when the demand for asphaltenes is low and the demand for the products from drum 40 is exceptionally strong. When there is a need for catalytic cracker charge, the plant is operated to produce a high yield of oil from drum 50 which may be used as feed to a catalytic cracker. Before the oil from drum 50 may be fed to a catalytic cracker, it is usually necessary to reduce the trace metals content to prevent poisoning the catalytic cracking catalyst. It has been discovered that reduction of sulfur and trace metals may be very economically achieved by circulating the oil from drum 50 to a conventional catalytic Hydrofining unit prior to charging the oil to a catalytic cracker. During this operation, the oil fraction may be contacted with hydrogen gas at high temperature (700–800° F.) and pressure (600–800 p.s.i.g.) over a cobalt-molybdenum catalyst to remove detrimental impurities including sulfur, nitrogen, oxygen and metals. However, other methods for removing non-metallic substances such as sulfur or trace metals such as iron, vanadium and nickel may be used. Thus, by operating the plant of Fig. 2 to produce low yields of asphaltenes, it is possible to produce special asphaltic type products not heretofore available commercially and simultaneously therewith obtain maximum yields of oil which may readily be converted into suitable catalytic charge stock. Hence, a refiner operating a plant in accordance with the invention has greater freedom in the manner the asphaltic material is processed to produce asphaltenes, resins, asphaltene-resin fractions of 200–300° F. softening point, or oils suitable as charge stock for a catalytic cracker and a product suitable for No. 6 fuel oil.

It has also been discovered that the plant of Fig. 2 may be operated so as to produce no asphaltenes in drum 20 and thereby produce catalytic cracker charge stock much more economically than may be produced by coking asphalt. Not only is this type of operation more economical, but the yield of catalytic cracker charge is greater and the resulting gasoline is superior to the catalytic cracked gasoline obtained from a charge produced by coking asphalt to obtain coker gas oil.

To further illustrate the operation of the plant of Fig. 2 to produce an asphaltene-resin fraction of low granular cohesion and of about 200–300° F. softening point and a maximum yield of asphaltic oil suitable after Hydrofining as a catalytic charge stock, drum 20 is by-passed and the mixed solvent-asphalt mixture from the venturi mixer 14 is charged to drum 40 via line 38. The temperature of the mixture going to this vessel is within 50° F. of the critical temperature of the solvent. When the solvent is n-pentane, the temperature preferably should be about 350–375° F. and the pressure should be at least 25 p.s.i.g. above the equilibrium pressure of n-pentane at this temperature. The heavy fraction separating from drum 40 via line 42 has a softening point of about 250 to 290° F. and is a mixture of asphaltenes and resins. Also, this asphaltene-resin fraction is substantially free of oil and is further characterized as having low granular coherence.

The product passing overhead from drum 40 via line 46 contains solvent, oil and soft resins. Thus, the asphaltic oil from drum 50 may have a Furol viscosity at 210° F. of from about 35 to 100 seconds. If the asphaltic oil contains some soft resins, the viscosity will be greater than 100 seconds Furol at 210° F. Often, mixtures of asphaltic oil and soft resins up to about 160 seconds Furol at 210° F. may be Hydrofined to produce a catalytic cracker charge having catalyst poisoning properties low enough to be tolerated but the amount of hydrogen required to reduce the sulfur and metal content of such an asphaltic oil-soft resin mixture to a level tolerated in a catalytic cracker charge may become prohibitive.

As the specific example of the above described operation, an asphalt having a softening point of 115° F. was treated with 10 volumes of n-pentane at a temperature of 360° F. to separate a 45 volume percent yield of an asphaltene-resin fraction having a softening point of about 220° F. The pressure was about 100 lbs. above the equilibrium pressure of the solvent at the temperature of treatment. The resulting asphaltene-resin fraction was withdrawn and the solvent recovered from the remaining solvent solution to obtain an asphaltic oil fraction in a 55 volume percent yield. The asphaltic oil fraction was treated with hydrogen at 700° F. and 800 p.s.i.g. to give a 100 volume percent yield of material shown as the "after Hydrofining" product of Table III below. This material was distilled to remove 25 volume percent of light product boiling up to 650° F. and the remaining 75 volume percent was catalytically cracked at 950° F. to produce gasoline in 50 volume percent yield based on the charge to the catalytic cracker.

Table III below gives typical test data on an asphaltic oil of the invention before and after Hydrofining to convert it into a satisfactory catalytic cracker charge stock.

TABLE III

| Test | Asphaltic Oil | |
|---|---|---|
| | Before Hydrofining | After Hydrofining |
| ° API | 17.0 | 23.9 |
| Sulfur, wt. percent | 1.32 | 0.57 |
| Viscosity, Furol Sec. at 210° F | 45.7 | 3.5 |
| UOPK | 11.90 | 11.85 |
| Distillation, Vacuum (corr.) ° F.: | | |
| 10% | 910 | 391 |
| 30% | 995 | 681 |
| 50% | | 891 |
| Hydrogen consumed, s.c.f./b | | 322 |

| Test | Metal Analysis, p.p.m. | |
|---|---|---|
| | Before Hydrofining | After Hydrofining |
| Ash | 96 | 37 |
| Fe | .06 | 0.05 |
| Ni | 20 | 7.3 |
| V | 36 | 15.5 |

Figures 5 through 9 graphically illustrate various features and embodiments of the present invention above described when using pentane as a solvent and treating an asphalt having a softening point of about 110° F. or a flux having a softening point of about 78° F. ±7° F. Referring now to Figure 5, the manner in which a resin-containing fraction, after separation of an asphaltene fraction, varies in softening point with the resin separation temperature is graphically illustrated when treating asphalts and fluxes at various asphaltene separation temperatures. The apparatus used in obtaining the data of Fig. 5 was identical with that of Figure 2. The feed stock used in obtaining the data for curves D and F was produced by separating an asphaltene fraction from asphalt having a softening point of about 110° F. at separation temperatures in vessel 20 of Fig. 2 of 316–322° F. and 290–311° F., respectively; while the feed stock used in obtaining the data for curves E and G was produced by separating an asphaltene fraction from a flux having a softening point of about 78° F.±7° F. at asphaltene separation temperatures in vessel 20 of 304–320° F. and 288–298° F., respectively. The residual asphalt-type bituminous material remaining in solution after removal of the asphaltenes under the conditions noted on curves D, E, F and G was then used as feed to a vessel such as 40 of Fig. 2, with the softening point of the resulting resin-containing fraction varying with the resin separation temperature as indicated by curves D, E, F and G. For example, the softening point of the resin-containing fraction varies inversely with the separation temperature within the temperature limits illustrated.

Figure 6 illustrates the manner in which the viscosity of asphaltic oils remaining in solution after the Figure 5 treatments varies with the resin separation temperatures of Fig. 5. For example, curve H of Fig. 6 corresponds to curves D and F of Fig. 5, curve I of Fig. 6 corresponds to curve E of Fig. 5 and curve J of Fig. 6 corresponds to curve G of Fig. 5. The legends on curves H, I and J are the same as in Fig. 5, and reference may be had to the discussion of Figure 5 for their meaning. Upon reference to curves H, I and J, it may be noted that the viscosity of the asphaltic oils, after removal of solvent, decreases with an increase in the resin separation temperature.

Figure 7 graphically illustrates the manner in which the color of asphaltic oils produced under the Figs. 5 and 6 conditions varies with viscosity. For example, as shown by curve K, when flux having a softening point as above mentioned in connection with the discussion of Fig. 5 is treated with pentane under the Figs. 5 and 6 conditions, the NPA color of the oil increases with viscosity. This is also true with respect to asphalt, as may be apparent upon reference to curve L.

Figure 8 graphically illustrates the manner in which the asphaltene yield varies with the asphaltene separation temperature in vessel 20 of Figure 2 when using n-pentane as a solvent. The asphalt and flux treated under the conditions illustrated in Fig. 8 had properties as above discussed for Fig. 5. Upon reference to curves M and N, it may be noted that the asphaltene yield shows some decrease with an increase in asphaltene separation temperature within the relatively restricted temperature limits illustrated. This trend reverses at about 50° F. below the critical temperature of n-pentane, or at about 340° F. Isopentane, however, has a relatively flat asphaltene yield-temperature curve over the entire range from room temperature to within 50° F. of its critical temperature. Upon reference to Fig. 9, which graphically illustrates the manner in which the asphaltene softening point varies with a change in the solvent to asphalt-type bituminous material ratio, it may be noted that an increase in the ratio also results in an increase in the softening point of the separated asphaltene fraction. The points F and A illustrate points for the flux charge and asphalt charge, respectively, while the curve O is taken approximately midway between these points to thereby provide an approximate average for asphalt-type bituminous materials.

Figures 5 through 9 provide data for selecting conditions of treatment for producing asphaltene fractions, resin fractions, asphaltene-resin fractions and asphaltic oil fractions having properties desired in a specific instance. In instances where an asphaltene-resin fraction is desired, the resin fraction softening points of Fig. 5 will provide the approximate softening point of an asphaltene-resin fraction when increased approximately 40–50° F.

While the foregoing discussion is primarily concerned with the separation of asphalt-type bituminous material into two or more fractions when using the hydrocarbon solvents disclosed herein and mixtures thereof, small amounts of other substances which do not have a substantial adverse effect may be present in the solvent in some instances without departing from the present invention.

The foregoing detailed description and the following examples are for the purpose of illustration only, and are not intended as limiting to the scope of the present invention which is set forth in the claims.

*Example I*

The following tabulated data illustrate the separation of specified asphalt-type bituminous materials into an asphaltene fraction and a resin-oil fraction in accordance with the method of the present invention when using paraffin hydrocarbons containing 5 through 8 carbon atoms, inclusive, as a solvent. For the purpose of comparison, data are also included which illustrate the separation of the same asphalt-type bituminous materials using conventional techniques at atmospheric pressure and room temperature. In the case of normal butane which has a boiling point of 31° F. and commercial butane, it was necessary to use elevated pressure even when operating at room temperature, and extremely high pressures when operating at elevated temperatures.

| No. | Material Treated | Solvent | Solvent: Material Volume Ratio | Temp., °F. | Press., p.s.i.g. | Asphaltene Fraction | | | Resin-Oil Fraction | |
|---|---|---|---|---|---|---|---|---|---|---|
| | | | | | | State | Yield, Wt. Percent | Soft. Point, °F. | Yield, Wt. Percent | Soft. Point, °F. |
| 1 | Vacuum-reduced asphalt, 117° F. soft. pt., 87 pen. at 77° F. | Commercial butane.[1] | 6:1 | 98 | 30 | semi-solid | 39 | 260 | 61 | 63.5 |
| 2 | do | do.[1] | 10:1 | 187 | 2,950 | liquid | 40 | 310 | 60 | soft |
| 3 | do | i-pentane | 10:1 | 98 | 0 | solid | 29 | 310 | 71 | 74 |
| 4 | do | do | 7:1 | 246 | 140 | liquid | 28 | 310 | 72 | 76 |
| 5 | do | n-pentane | 10:1 | 75 | 0 | solid | 25 | 320 | 75 | 82 |
| 6 | do | do | 7:1 | 300 | 140 | liquid | 21 | 345 | 79 | 83 |
| 7 | Steep roofing blown asphalt, 195° F. soft. pt., 30 pen. at 77° F. | do | 10:1 | 75 | 0 | solid | 44 | 357 | 56 | 77 |
| 8 | do | do | 10:1 | 202 | 55 | liquid | 46 | 410 | 54 | 74 |
| 9 | do | n-hexane | 10:1 | 75 | 0 | solid | 11 | 350 | 89 | 184 |
| 10 | do | do | 7:1 | 250 | 40 | liquid | 10 | 350 | 90 | 178 |
| 11 | do | n-heptane | 10:1 | 75 | 0 | solid | 26 | too hard | 74 | 90.5 |
| 12 | do | do | 7:1 | 252 | 25 | liquid | 10 | do | 90 | 172 |
| 13 | do | i-octane | 10:1 | 75 | 0 | solid | 41 | do | 59 | 74.5 |
| 14 | do | do | 7:1 | 259 | 35 | liquid | 16 | 331 | 84 | 185 |

[1] Analysis of a sample of the particular commercial butane used indicated the following mol percent composition: 71.84% n-butane, 22.78% isobutane, 5.26% propane, 0.12% isopentane.

Example II

The following tabulated data illustrate the separation of asphaltenes in the liquid phase from a vacuum-reduced asphalt of 109 penetration at 77° F. and a softening point of 111° F. using normal pentane as a solvent and varying the solvent to asphalt material volume ratio to show the effect obtained by so doing. A comparison of the softening points of the petrolene fraction obtained at different solvent to asphalt-material ratios is indicative of the selective effects due to variation in the solvent to asphalt-material ratio. For example, the softening point of the petrolene fraction obtained at a 5:1 solvent to asphalt-material ratio indicates a considerable improvement in selectivity over the petrolene fraction obtained at a 3:1 ratio.

| Solvent: Material Volume Ratio | Temp., °F. | Press., p.s.i.g. | Asphaltenes | | Petrolenes | |
|---|---|---|---|---|---|---|
| | | | Yield, Wt. Percent | Soft. Pt., °F. | Yield, Wt. Percent | Soft. Pt., °F. |
| 3:1 | 240 | 110 | 10.6 | 312 | 89.4 | 102 |
| 5:1 | 200 | 65 | 14.6 | 314 | 85.4 | 94.5 |
| 7:1 | 250 | 125 | 15.8 | 335 | 84.2 | 92 |
| 10:1 | 250 | 125 | 16.6 | 363 | 83.4 | 91 |

Example III

The following tabulated data illustrate the separation of specified asphalt-type bituminous materials into a liquid phase asphaltene fraction having a softening point of at least 300° F. and a resin-oil fraction in accordance with the method of the invention using paraffin hydrocarbon solvents containing 5 through 8 carbon atoms, inclusive. It was not possible to separate an asphaltene fraction having a softening point of at least 300° F. under the temperature and pressure conditions employed when using n-butane as the solvent.

| Run No. | Material Treated Soft. Point | Solvent | Solvent: Material Volume Ratio | Density | | Temp., °F. | Press., p.s.i.g. | Asphaltene Fraction | | | Resin-Oil Fraction | |
|---|---|---|---|---|---|---|---|---|---|---|---|---|
| | | | | Solvent | Phase | | | State | Yield, Wt. Percent | Soft. Point | Yield, Wt. Percent | Soft. Point |
| 1 | 117 | n-butane | 6:1 | 0.47 | 0.53 | 210 | 260 | liquid | 44 | 250 | 56 | too soft. |
| 2 | 117 | Isopentane | 7:1 | 0.50 | 0.55 | 246 | 140 | do | 28 | 310 | 72 | 76. |
| 3 | 117 | n-pentane | 7:1 | 0.47 | 0.52 | 300 | 140 | do | 21 | 345 | 79 | 83. |
| 4 | 117 | n-hexane | 7:1 | 0.56 | 0.62 | 250 | 55 | do | <5.0 | | | 115. |
| 5 | 117 | isooctane | 7:1 | 0.60 | 0.65 | 250 | 35 | do | <5.0 | | | 115. |
| 6 | 195 | n-pentane | 10:1 | 0.55 | 0.58 | 202 | 55 | do | 46 | 410 | 54 | 74. |
| 7 | 195 | n-hexane | 7:1 | 0.56 | 0.61 | 250 | 40 | do | 10 | 350 | 90 | 178. |
| 8 | 195 | n-heptane | 7:1 | 0.59 | 0.63 | 252 | 25 | do | 10 | too hard | 90 | 172. |
| 9 | 195 | isooctane | 7:1 | 0.60 | 0.64 | 250 | 35 | do | 16 | 331 | 84 | 185. |
| 10 | 111 | n-pentane | 3:1 | 0.52 | 0.62 | 240 | 110 | do | 10.6 | 312 | 89.4 | 102. |
| 11 | 111 | do | 5:1 | 0.55 | 0.61 | 200 | 65 | do | 14.6 | 314 | 83.4 | 95. |
| 12 | 111 | do | 7:1 | 0.51 | 0.56 | 250 | 125 | do | 15.8 | 335 | 84.2 | 92. |
| 13 | 111 | do | 10:1 | 0.51 | 0.55 | 250 | 125 | do | 16.6 | 363 | 83.4 | 91. |

Example IV

A vacuum-reduced asphalt having a 117° F. softening point and a penetration of 87 at 77° F. was treated with 7 volumes of normal pentane per volume of vacuum-reduced asphalt at a temperature of 300° F. and a pressure of 140 p.s.i.g. to remove a liquid asphaltene fraction having a softening point of 345° F. in a yield by weight of 21%. This separation is illustrated in Example I under run 6. The resin-oil fraction of 79% by weight of the original vacuum-reduced asphalt and having a softening point of 83° F. was subjected to a variety of temperature and pressure conditions as illustrated by the tabulated data below in order to separate a resin fraction in the liquid phase while the resins and oils were dissolved in the pentane. The temperature conditions employed were, in accordance with the present invention, above 50° F. below the critical temperature of normal pentane which is 386° F., and the pressures employed corresponded to at least the vapor pressure of normal pentane at the selected temperatures up to the critical temperature and, when the temperatures were above the critical, to at least the vapor pressure as determined by extrapolating the vapor pressure curve by the Cox vapor pressure chart using water as a reference substance.

It will be noted that it is possible to separate a liquid phase resin fraction having a softening point of at least 175° F. when operating under preferred conditions and in accordance with the present invention. The resin fractions thus separated and having a softening point in excess of 175° F. are very desirable when used for numerous applications due to their unusual properties. For example, solutions of such resins have been found to be non-gelling.

| Solvent Density d | Temp., °F. | Press., p.s.i.a. | Resin yield, wt. percent based on resin-oil weight | Resin Soft. Point, °F. | Oil yield, wt. percent based on resin-oil weight | Viscosity of oil in Saybolt Furol Sec. at 210° F. |
|---|---|---|---|---|---|---|
| 0.40 | 350 | 405 | 25.1 | 181.5 | 74.9 | 124 |
| 0.375 | 365 | 444 | 25.0 | 190 | 75.0 | 129.5 |
| | 380 | 590 | 31.6 | 171 | 68.4 | 110 |
| | 396 | 765 | 25.0 | 195 | 75.0 | 107 |
| | 348 | 375 | 17.5 | 228 | 82.5 | 170.5 |
| | 365 | 425 | 25.7 | 199 | 74.3 | 123 |
| | 380 | 495 | 45.7 | 141 | 54.3 | 85 |
| | 398 | 575 | 61.5 | 120 | 38.5 | 58 |
| 0.38 | 410 | 690 | 61.0 | 121 | 39.0 | 57 |
| | 382 | 485 | 46.7 | 136 | 53.3 | 80 |
| | 396 | 545 | 63.0 | 116 | 47.0 | 53 |
| 0.33 | 418 | 675 | 86.2 | 96.5 | 13.8 | |

Example V

Selected resin-oil solutions obtained in Example I under high temperature conditions in runs 2, 4, 10 and 14 were subjected to temperatures above 50° F. below the critical temperature of the solvent in order to obtain a resin fraction in the liquid phase. In connection with the first normal hexane resin-oil solution treated, it will be noted that the pressure employed was below the equilibrium vapor pressure of the solvent at the temperature employed with the result that 100% precipitation in the liquid phase was obtained.

| d | Solvent | Solvent rich phase Run No. from Example I | Temp., °F. | Press., p.s.i.a. | Equilibrium vapor press. for temp. of treatment, p.s.i.a. | Resin yield, wt. percent based on resin-oil weight | Oil yield, wt. percent based on resin-oil weight |
|---|---|---|---|---|---|---|---|
| 0.30 | n-butane | Run 2 | 302 | 545 | 540 | 95 | 5 |
|  | iso-pentane | Run 4 | 382 | 535 | 520 | 72 | 28 |
|  | n-hexane | Run 10 | 490 | 485 | 590 | 100 | 0 |
|  | n-hexane | Run 10 | 510 | 815 | 630 | 34 | 66 |
|  | iso-octane | Run 14 | 588 | 570 | est. 470 | 43 | 57 |

*Example VI*

The method of the present invention is also useful in separating a liquid phase asphaltene fraction having a softening point of at least 300° F. from crudes.

The following tabulated data illustrate the separation of a Mississippi crude into an aphaltene fraction and a petrolene fraction using pentane as the solvent. The particular Mississippi asphalt-type crude was characterized by the following tests:

| Gravity 60° F., API Distillation, Vol. Percent | 14.5 Vapor Temp., °F. (corrected to 1 atm.) |
|---|---|
| IBP | 113 |
| 5 | 375 |
| 10 | 475 |
| 20 | 615 |
| 30 | 750 |
| 35 | 820+ |

TEST ON RESIDUE FROM DISTILLATION

Yield _____ percent__ 65
Soft. point, °F. _____ 155
Pen. at 77° F. _____ 19
Gravity, 60° F., API _____ 10

The following runs were made using pentane as a solvent on the above crude and without removal of the distillate fractions:

| Run No. | Solvent Ratio | Temp., °F. | Press. p.s.i.g. | Asphaltene Fraction | | | Petrolene Fraction | |
|---|---|---|---|---|---|---|---|---|
|  |  |  |  | State | Yield | Soft. Pt., °F. | Yield | Soft. Pt. |
| A | 7:1 | 85 | 0 | Solid | 32.0 | 333 | 68.0 | too soft. |
| B | 10:1 | 85 | 0 | Solid | 33.1 | 337 | 66.9 | Do. |
| C | 10:1 | 252 | 120 | Fluid | 22 | 332 | 78.0 | Do. |

Petrolene solutions obtained in the manner of the foregoing separation were subjected to further elevated temperature and pressure, as particularly illustrated in Example IV, for the purpose of separating the petrolenes into liquid phase resin fractions and oil fractions. The resin fractions thus obtained had softening points between 140° F. and 160° F.

The oil fractions thus obtained were of a low viscosity due to presence of lower boiling materials which were not removed from the crude by distillation prior to separation of the asphaltene and resin fractions. When these oil fractions were distilled, the usual lighter fractions contained in crude oil such as gasoline, kerosene, gas oil and light lube oil were obtained in addition to heavy oils.

It will be apparent from Example VI that the process of the invention provides a means for obtaining an asphaltene fraction having a softening point of 300° F. or higher, a resin fraction and an oil fraction from some crude without the necessity of first distilling off the lighter fractions. The lighter fractions present in the crude can be obtained in usual yield from the separated oil fraction.

*Example VII*

The following tabulated data illustrate the separation of a vacuum-reduced asphalt having a softening point of 117° F. and a penetration of 87 at 77° F. into an asphaltene fraction and a resin-oil fraction in accordance with the method of the present invention. The solvent employed was isobutylene and the solvent to asphalt ratio was 10:1.

| Temp., °F. | Press., p.s.i.g. | Asphaltene Phase | | Resin-Oil Phase | |
|---|---|---|---|---|---|
|  |  | Wt. percent | Soft. Pt., °F. | Wt. percent | Soft. Pt., °F. |
| 70 | 50 | 29 |  | 71 |  |
| 136 | 80 | 34.3 | 307 | 65.7 | 70 |
| 168 | 135 | 34.2 | 307 | 65.8 | 71.5 |
| 206 | 220 | 36.0 | 290 | 64.0 | 66.5 |
| 240 | 530 | 39.3 | 290 | 60.7 | too soft |

Each of the asphaltene phases separated above was in the liquid phase with the exception of the first which was separated at room temperature and 50 p.s.i.g. The first asphaltene fraction was obtained as a solid.

*Example VIII*

The following tabulated data illustrate the separation of a steep roofing blown asphalt having a softening point of 195° F. into an asphaltene fraction and a resin-oil fraction in accordance with the method of the present invention. The solvent employed was isobutylene and the solvent to asphalt ratio was 10:1.

| Temp., °F. | Press., p.s.i.g. | Asphaltene Phase | | Resin-Oil Phase | |
|---|---|---|---|---|---|
|  |  | Wt. percent | Soft. Pt., °F. | Wt. percent | Soft. Pt., °F. |
| 70 | 35 | 49.0 | 400 | 51.0 |  |
| 240 | 300 | 50.0 | 350 | 50.0 | 80 |

The asphaltene phase separated above at 70° F. and 35 p.s.i.g. was in the solid state whereas the asphaltene phase separated at 240° F. and 300 p.s.i.g. was in the fluid or liquid state.

*Example IX*

The following tabulated data illustrate the separation of a vacuum-reduced asphalt having a softening point of 117° F. and a penetration of 87 at 77° F. into an asphaltene fraction and a resin-oil fraction in accordance with the method of the present invention. The solvent employed was pentene-2 and the solvent to asphalt ratio was 10 to 1.

| Temp., °F. | Press., p.s.i.g. | Asphaltene Phase | | Resin-Oil Phase | |
|---|---|---|---|---|---|
| | | Wt. percent | Soft. Pt., °F. | Wt. percent | Soft. Pt., °F. |
| 70 | Atm. | 3.4 | | 96.6 | 121 |
| 252 | 130 | 19.4 | 400 | 80.6 | 90 |

The asphaltene phase separated above at room temperature and atmospheric pressure was in the solid state whereas the asphaltene phase separated at 252° F. and 130 p.s.i.g. was in the fluid or liquid state.

*Example X*

The following tabulated data illustrate the separation of a steep roofing blown asphalt having a softening point of 195° F. into an asphaltene fraction and a resin-oil fraction in accordance with the method of the present invention. The solvent employed was pentene-2 and the solvent to asphalt ratio was 10:1.

| Temp., °F. | Press., p.s.i.g. | Asphaltene Phase | | Resin-Oil Phase | |
|---|---|---|---|---|---|
| | | Wt. percent | Soft. Pt., °F. | Wt. percent | Soft. Pt., °F. |
| 70 | Atm. | 29.2 | | 70.8 | 119 |
| 254 | 130 | 43.6 | 400 | 56.4 | 98.5 |

The asphaltene phase separated at room temperature and atmospheric pressure was in the solid state. However, the asphaltene phase separated at 254° F. and 130 p.s.i.g. pressure was in the liquid state.

*Example XI*

The following tabulated data illustrate the separation of a vacuum-reduced asphalt having a softening point of 117° F. and a penetration of 87 at 77° F. into a liquid phase asphaltene fraction and a resin-oil fraction in accordance with the method of the present invention. The solvent employed was butene-2 and the solvent to asphalt ratio was 10:1.

| Temp., °F. | Press., p.s.i.g. | Asphaltene Phase | | Resin-Oil Phase | |
|---|---|---|---|---|---|
| | | Wt. percent | Soft. Pt., °F. | Wt. percent | Soft. Pt., °F. |
| 206 | 135 | 24.0 | 330 | 76.0 | 87 |

*Example XII*

The resin-oil fraction obtained in Example VII above when operating at a temperature of 168° F. and a pressure of 135 p.s.i.g. was subjected to increased pressure and temperature conditions employing isobutylene as the solvent and a solvent to bituminous material ratio of 10:1. Separate resin and oil fractions were obtained as follows:

| Temp., °F. | Press., p.s.i.g. | Resins | | Oils | |
|---|---|---|---|---|---|
| | | Yield, Wt. percent | Soft. Pt., °F. | Yield, Wt. percent | Soft. Pt., °F. |
| 268 | 650 | 23.4 | 138.5 | 76.6 | too soft |

After removal of the liquid resin phase, the oils were recovered from the solvent solution by simple flashing.

*Example XIII*

The resin-oil fraction obtained in Example VIII above when operating at a temperature of 240° F. and a pressure of 300 p.s.i.g. was subjected to increased pressure and temperature conditions employing isobutylene as the solvent and a solvent to bituminous material ratio of 10:1. Separate resin and oil fractions were obtained as follows:

| Temp., °F. | Press., p.s.i.g. | Resins | | Oils | |
|---|---|---|---|---|---|
| | | Yield, Wt. percent | Soft. Pt., °F. | Yield, Wt. percent | Soft. Pt., °F. |
| 291 | 600 | 35.7 | 86 | 64.3 | too soft |

After removal of the liquid resin phase, the oils were recovered from the solvent solution by simple flashing.

*Example XIV*

The following tabulated data illustrate the separation of asphalt-type bituminous material into a liquid phase asphaltene fraction and a resin-oil fraction in accordance with the method of the present invention when employing various mono-olefin hydrocarbon solvents and a solvent to asphalt-type bituminous material ratio of 10:1.

| Solvent | Solvent Ratio | Solvent Density | Temp., °F. | Press., p.s.i.g. | Asphaltenes | | Resins-Oils | | Charge Stock Soft Point, °F. |
|---|---|---|---|---|---|---|---|---|---|
| | | | | | Yield, Wt. percent | Soft. Point, °F. | Yield, Wt. percent | Soft. Point, °F. | |
| isobutylene | 10:1 | 0.55 | 136 | 80 | 34 | 307 | 66 | 70 | 117 |
| Do | 10:1 | 0.52 | 168 | 135 | 34 | 307 | 66 | 72 | 117 |
| Do | 10:1 | 0.48 | 206 | 220 | 36 | 290 | 64 | 66 | 117 |
| Do | 10:1 | 0.44 | 240 | 530 | 39 | 290 | 61 | too soft | 117 |
| pentene-2 | 10:1 | 0.52 | 252 | 130 | 19 | >400 | 81 | 90 | 117 |
| butene-1 | 10:1 | 0.50 | 190 | 130 | 33 | 305 | 67 | 72 | 117 |
| butene-2 | 10:1 | 0.51 | 206 | 135 | 24 | 330 | 76 | 87 | 117 |
| propylene | 10:1 | 0.38 | 170 | 430 | 77 | [2]163 | 23 | | 117 |
| heptylene | 10:1 | 0.62 | 200 | [1] | [1] | [1] | [1] | [1] | 117 |
| Do | 10:1 | 0.59 | 250 | [1] | [1] | [1] | [1] | [1] | 117 |
| isobutylene | 10:1 | 0.44 | 240 | 300 | 50 | 350 | 50 | 80 | 195 |
| pentene-2 | 10:1 | 0.52 | 254 | 130 | 44 | >400 | 56 | 99 | 195 |

[1] Complete miscibility.
[2] A Strieter analysis of this product indicated an appreciable content of oils and resins.

*Example XV*

The following tabulated data illustrate the separation of a vacuum-reduced asphalt having a softening point of 117° F. and a penetration of 87 at 77° F. into a liquid phase asphaltene fraction and a resin-oil fraction in accordance with the method of the present invention. The solvent employed was butene-1 and the solvent to asphalt ratio was 10:1.

| Temp., °F. | Press., p.s.i.g. | Asphaltene Phase | | Resin-Oil Phase | |
|---|---|---|---|---|---|
| | | Wt. percent | Soft. Pt., °F. | Wt. percent | Soft. Pt., °F. |
| 190 | 130 | 33.3 | 305 | 66.7 | 72 |

Example XVI

Upon referring to the table of Example XIV, it will be noted that heptylene and asphalt are completely miscible under the operating conditions described therein. The following illustrates suitable operating conditions for obtaining a liquid phase asphaltene fraction having a softening point of at least 300° F. when using heptylene as the solvent.

A soft asphalt is charged to a Jerguson gauge and sufficient heptylene added to give a 15:1 solvent to soft asphalt ratio. Under agitation at room temperature, substantially all of the soft asphalt dissolves in the heptylene with the exception of a very small amount of hard asphaltenes having a softening point of about 400° F.

The Jerguson gauge is then closed and placed in an oil bath. The temperature is slowly raised, with the Jerguson gauge being removed from the oil bath and the contents agitated at frequent intervals.

As the temperature approaches 250° F., the amount of precipitated asphaltenes noted at room temperature decreases and at a temperature of about 250° F. the heptylene and soft asphalt are completely miscible. On further heating to a temperature approaching the paracritical temperature of heptylene, the separation of a heavy phase occurs with the amount of heavy phase increasing with an increase in temperature. Upon reaching a maximum temperature in the vicinity of 460° F., a good yield of heavy phase is obtained which may be easily removed from the Jerguson gauge while in the liquid phase. The heavy phase has a softening point of about 325° F. and contains asphaltenes substantially free of resins and oils.

Example XVII

Various petroleum distillate fractions were used to treat a vacuum reduced crude having a softening point of about 117° F. Each volume of vacuum reduced crude was treated with ten volumes of solvent at elevated temperature and pressure, the temperature being about 275° F. and the pressure being slightly greater than the equilibrium pressure for the specific petroleum fraction at this temperature. A liquid heavy asphaltene fraction was obtained which readily extruded from the treating vessel. The yield of asphaltene was very satisfactory.

The exact nature of each of the fractions used as a solvent may be readily determined from the analysis in Table A, below.

TABLE A
ANALYSIS OF THE PETROLEUM FRACTIONS

| Fraction No. | 1[1] | 2[2] | 3[2] | 4[2] |
|---|---|---|---|---|
| P.O.N.A. composition (U.O.P. Method H-273): | | | | |
| Paraffins, percent | 35 | 40 | 29 | 31 |
| Olefins, percent | 65 | 56 | 58 | 52 |
| Naphthenes, percent | | 3 | 10 | 11 |
| Aromatics, percent | | 1 | 3 | 6 |
| Bromine Number | 150 | 104 | 109 | 95 |
| Gravity, API | | 76 | 69 | 63 |
| Distillation: | | | | |
| IBP, °F | | 118 | 154 | 188 |
| 5% | | 138 | 157 | 190 |
| 10% | | 138 | 158 | 190 |
| 50% | | 141 | 161 | 195 |
| 90% | | 147 | 172 | 202 |
| 95% | | 150 | 178 | 205 |

[1] An olefin enriched distillate boiling below about 120° F.
[2] Obtained by fractional distillation of a catalytic cracked naphtha.

As is well known, the bromine member for a monoolefin hydrocarbon such as pentene is 228 and zero for a paraffin hydrocarbon such as pentane. In view of this and the data in Table A, it is apparent that a wide variety of solvent mixtures containing paraffin and monoolefin hydrocarbons may be used in practicing the present invention.

What is claimed is:

1. A method of separating an asphalt-type bituminous material including asphaltenes into at least two fractions; which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent which consists essentially of at least one hydrocarbon selected from the group consisting of monoolefin hydrocarbons containing from 4 through 7 carbon atoms inclusive and paraffin hydrocarbons containing from 5 through 8 carbon atoms inclusive; the temperature of treatment being at least 125° F. when the solvent consists essentially of at least one of the mono-olefin hydrocarbons, at least 175° F. when the solvent consists essentially of at least one of the paraffin hydrocarbons and, when the solvent is a mixture of the monoolefin and paraffin hydrocarbons, the minimum temperature of treatment being intermediate 125° F. and 175° F. and varying directly within this range with the paraffin hydrocarbon content of the solvent; the temperature of treatment being sufficiently elevated to form a liquid to liquid bulk interface between the resulting heavy asphaltene fraction and the lighter solvent fraction containing dissolved residual asphalt-type bituminous material and not greater than about 50° F. below the critical temperature of the solvent; the pressure being at least equal to the vapor pressure of the solvent at the highest temperature present in the treating zone; the separated heavy asphaltene fraction being in the liquid phase and having a viscosity whereby it is freely flowable from the treating zone; and withdrawing the liquid phase asphaltene fraction from the treating zone, the asphaltene fraction having a softening point of at least about 300° F.

2. The method of claim 1 wherein the temperature of the lighter solvent fraction containing dissolved residual asphalt-type bituminous material is increased to above the equilibrium temperature of the solvent at the prevailing pressure to separate solvent.

3. The method of claim 1 wherein each volume of the asphalt-type bituminous material is treated with at least 4 volumes of solvent.

4. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one paraffin hydrocarbon containing from 5 through 8 carbon atoms inclusive, the temperature of treatment being at least 175° F. and sufficient to form a liquid to liquid bulk interface between the resulting heavy asphaltene fraction and the lighter solvent fraction containing dissolved residual asphalt-type bituminous material and not greater than about 50° F. below the critical temperature of the solvent, the pressure being at least equal to the vapor pressure of the solvent at the highest temperature present in the treating zone, the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least about 300° F.

5. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one mono-olefin hydrocarbon containing from 4 through 7 carbon atoms inclusive, the temperature of treatment being at least 125° F. and sufficient to form a liquid to liquid bulk interface between the resulting heavy asphaltene fraction and the lighter solvent fraction containing dissolved residual asphalt-type bituminous material and not greater than about 50° F. below the critical temperature of the solvent, the pressure being at least equal to the vapor pressure of the solvent at the highest temperature present in the treating zone, the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least about 300° F.

6. A method of separating an asphalt-type bituminous material including asphaltenes and oils into at least two fractions; which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent which consists essentially of at least one hydrocarbon selected from the group consisting of mono-olefin hydrocarbons containing from 4 through 7 carbon atoms inclusive and paraffin hydrocarbons containing from 5 through 8 carbon atoms inclusive; the temperature of treatment being at least 125° F. when the solvent consists essentially of at least one of the mono-olefin hydrocarbons, at least 175° F. when the solvent consists essentially of at least one of the paraffin hydrocarbons and, when the solvent is a mixture of the mono-olefin and paraffin hydrocarbons, the minimum temperature of treatment being intermediate 125° F. and 175° F. and varying directly within this range with the paraffin hydrocarbon content of the solvent; the temperature of treatment being sufficiently elevated to form a liquid to liquid bulk interface between the resulting heavy asphaltene fraction and the lighter solvent fraction containing dissolved residual asphalt-type bituminous material and not greater than about 50° F. below the critical temperature of the solvent; the pressure being at least equal to the vapor pressure of the solvent at the highest temperature present in the treating zone; the separated heavy asphaltene fraction being in the liquid phase and having a viscosity whereby it is freely flowable from the treating zone; withdrawing the liquid phase asphaltene fraction from the treating zone, the asphaltene fraction having a softening point of at least about 300° F.; separating a fraction of residual asphalt-type bituminous material from a lighter solvent fraction containing oils by treating in a treating zone under further elevated temperature and pressure conditions the lighter solvent fraction containing dissolved residual asphalt-type bituminous material, the temperature of this treaatment being greater than 50° F. below the critical temperature of the solvent and the pressure at temperatures up to the critical temperature being at least equal to the vapor pressure of the solvent at the highest temperature present in the treating zone, and at temperatures above the critical temperature, the pressure being at least equal to the value obtained by extrapolating the vapor pressure curve of the solvent by a Cox vapor pressure chart extrapolation using water as the reference substance; the separated fraction of residual asphalt-type bituminous material being in the liquid phase and having a viscosity whereby it is freely flowable from the treating zone; and withdrawing the liquid phase fraction of residual asphalt-type bituminous material from the treating zone.

7. The method of claim 6 wherein the temperature of the lighter solvent fraction remaining after separation of the residual asphalt-type bituminous material fraction is increased to above the equilibrium temperature of the solvent at the prevailing pressure to separate solvent.

8. The method of claim 6 wherein solvent is recovered from the lighter solvent fraction remaining after separation of the residual asphalt-type bituminous material fraction and the resulting oils are passed to a process for producing gasoline therefrom which includes a cracking step.

9. The method of claim 6 wherein each volume of the asphalt-type bituminous material is treated with at least 4 volumes of solvent.

10. A method of separating an asphalt-type bituminous material including asphaltenes into a plurality of fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one paraffin hydrocarbon containing from 5 through 8 carbon atoms inclusive, the temperature of treatment being at least 175° F. and sufficient to form a liquid to liquid bulk interface between the resulting heavy asphaltene fraction and the lighter solvent fraction containing dissolved residual asphalt-type bituminous material and not greater than about 50° F. below the critical temperature of the solvent, the pressure being at least equal to the vapor pressure of the solvent at the highest temperature present in the treating zone, the separated heavy alphaltene fraction being in the liquid phase and having a viscosity whereby it is freely flowable from the treating zone, withdrawing the liquid phase asphaltene fraction from the treating zone, the asphaltene fraction having a softening point of at least about 300° F., separating a fraction of residual asphalt-type bituminous material from a lighter solvent fraction containing oils by treating in a treating zone under further elevated temperature and pressure conditions the lighter solvent fraction containing dissolved residual asphalt-type bituminous material, the temperature of this treatment being greater than 50° F. below the critical temperature of the solvent and the pressure at temperatures up to the critical temperature being at least equal to the vapor pressure of the solvent at the highest temperature present in the treating zone, and at temperatures above the critical temperature the pressure being at least equal to the value obtained by extrapolating the vapor pressure curve of the solvent by a Cox vapor pressure chart extrapolation using water as the reference substance, the separated fraction of residual asphalt-type bituminous material being in the liquid phase and having a viscosity whereby it is freely flowable from the treating zone, and withdrawing the liquid phase fraction of residual asphalt-type bituminous material from the treating zone.

11. A method of separating an asphalt-type bituminous material including asphaltenes into a plurality of fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one mono-olefin hydrocarbon containing from 4 through 7 carbon atoms inclusive, the temperature of treatment being at least 125° F. and sufficient to form a liquid to liquid bulk interface between the resulting heavy asphaltene fraction and the lighter solvent fraction containing dissolved residual asphalt-type bituminous material and not greater than about 50° F. below the critical temperature of the solvent, the pressure being at least equal to the vapor pressure of the solvent at the highest temperature present in the treating zone, the separated heavy asphaltene fraction being in the liquid phase and having a viscosity whereby it is freely flowable from the treating zone, withdrawing the liquid phase asphaltene fraction from the treating zone, the asphaltene fraction having a softening point of at least about 300° F., separating a fraction of residual asphalt-type bituminous material from a lighter solvent fraction containing oils by treating in a treating zone under further elevated temperature and pressure conditions the lighter solvent fraction containing dissolved residual asphalt-type bituminous material, the temperature of this treatment being greater than 50° F. below the critical temperature of the solvent and the pressure at temperatures up to the critical temperature being at least equal to the vapor pressure of the solvent at the highest temperature present in the treating zone, and at temperatures above the critical temperature the pressure being at least equal to the value obtained by extrapolating the vapor pressure curve of the solvent by a Cox vapor pressure chart extrapolation using water as the reference substance, the separated fraction of residual asphalt-type bituminous material being in the liquid phase and having a viscosity whereby it is freely flowable from the treating zone, and withdrawing the liquid phase fraction of residual asphalt-type bituminous material from the treating zone.

12. A method of separating an asphalt-type bituminous material including asphaltenes, resins and oils into at least two fractions, which method comprises separating a heavy fraction containing essentially asphaltenes and resins substantially free of asphaltic oils from a lighter solvent fraction containing dissolved residual asphalt-type bituminous material including oils by treating in a single treating zone at elevated temperature and pressure each volume of the asphalt-type bituminous material with at least two volumes of a solvent which consists essentially of at least one hydrocarbon selected from the group consisting of mono-olefin hydrocarbons containing from four through seven carbon atoms inclusive and paraffin hydrocarbons containing from five through eight carbon atoms inclusive, the temperature of treatment being greater than 50° F. below the critical temperature of the solvent and the pressure at temperatures up to the critical temperature being at least equal to the vapor pressure of the solvent at the highest temperature present in the treating zone, and at temperatures above the critical temperature the pressure being at least equal to the value obtained by extrapolating the vapor pressure curve of the solvent by a Cox vapor pressure chart extrapolation using water as the reference substance, the separated substantially asphaltic oil-free asphaltene-resin fraction being in the liquid phase and having a viscosity whereby it is freely flowable from the treating zone, and withdrawing the liquid phase asphaltene-resin fraction from the treating zone.

13. The method of claim 12 wherein the temperature of the lighter solvent fraction containing dissolved residual asphalt-type bituminous material including oils is increased to above the equilibrium temperature of the solvent at the prevailing pressure to separate solvent.

14. The method of claim 12 wherein solvent is recovered from the lighter solvent fraction containing dissolved residual asphalt-type bituminous material including oils and the resulting oils are passed to a process for producing gasoline therefrom which includes a cracking step.

15. The method of claim 12 wherein each volume of the asphalt-type bituminous material is treated with at least 4 volumes of solvent.

16. The method of claim 15 wherein solvent is recovered from the lighter solvent fraction containing dissolved residual asphalt-type bituminous material including oils and the resulting oils are passed to a process for producing gasoline therefrom which includes a cracking step.

17. A method of separating an asphalt-type bituminous material including asphaltenes, resins and oils into at least two fractions, which method comprises separating a heavy fraction containing essentially asphaltenes and resins substantially free of asphaltic oils from a lighter solvent fraction containing dissolved residual asphalt-type bituminous material including oils by treating in a single treating zone at elevated temperature and pressure each volume of the asphalt-type bituminous material with at least two volumes of a solvent consisting essentially of at least one paraffin hydrocarbon containing from 5 through 8 carbon atoms inclusive, the temperature of treatment being greater than 50° F. below the critical temperature of the solvent and sufficient to form a liquid-to-liquid bulk interface between the resulting heavy asphaltene-resin fraction and the lighter solvent fraction containing dissolved residual asphalt-type bituminous material including oils, the pressure at temperatures up to the critical temperature being at least equal to the vapor pressure of the solvent at the highest temperature present in the treating zone and at temperatures above the critical temperature the pressure being at least equal to the value obtained by extrapolating the vapor pressure curve of the solvent by a Cox vapor pressure chart extrapolation using water as a reference substance, the separated substantially asphaltic oil-free asphaltene-resin fraction being in the liquid phase and having a viscosity whereby it is freely flowable from the treating zone, and withdrawing the liquid phase asphaltene-resin fraction from the treating zone.

18. A method of separating an asphalt-type bituminous material including asphaltenes, resins and oils into at least two fractions, which method comprises separating a heavy fraction containing essentially asphaltenes and resins substantially free of asphaltic oils from a lighter solvent fraction containing dissolved residual asphalt-type bituminous material including oils by treating in a single treating zone at elevated temperature and pressure each volume of the asphalt-type bituminous material with at least two volumes of a solvent consisting essentially of at least one mono-olefin hydrocarbon containing from 4 through 7 carbon atoms inclusive, the temperature of treatment being greater than 50° F. below the critical temperature of the solvent and sufficient to form a liquid-to-liquid bulk interface between the resulting heavy asphaltene-resin fraction and the lighter solvent fraction containing dissolved residual asphalt-type bituminous material including oils, the pressure at temperatures up to the critical temperature being at least equal to the vapor pressure of the solvent at the highest temperature present in the treating zone and at temperatures above the critical temperature, the pressure being at least equal to the value obtained by extrapolating the vapor pressure curve of the solvent by a Cox vapor pressure chart extrapolation using water as the reference substance, the separated substantially asphaltic oil-free asphaltene-resin fraction being in the liquid phase and having a viscosity whereby it is freely flowable from the treating zone, and withdrawing the liquid phase asphaltene-resin fraction from the treating zone.

19. A method of separating an asphalt-type bituminous material including asphaltenes into at least two fractions; which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent which consists essentially of at least one hydrocarbon selected from the group consisting of mono-olefin hydrocarbons containing from 4 through 7 carbon atoms inclusive and paraffin hydrocarbons containing from 5 through 8 carbon atoms inclusive; the temperature of treatment being at least 125° F. when the solvent consists essentially of at least one of the mono-olefin hydrocarbons, at least 175° F. when the solvent consists essentially of at least one of the paraffin hydrocarbons and, when the solvent is a mixture of the mono-olefin and paraffin hydrocarbons, the minimum temperature of treatment being intermediate 125° F. and 175° F. and varying directly within this range with the paraffin hydrocarbon content of the solvent; the temperature of treatment being sufficiently elevated to form a liquid-to-liquid bulk interface between the resulting heavy asphaltene fraction and the lighter solvent fraction containing dissolved residual asphalt-type bituminous material; the temperature and pressure of treatment being so adjusted as to provide a solvent density at least as great as the density value indicated by the equation $$d = \frac{K}{\sqrt{MW}}$$

but less than the solvent density at which no liquid phase separation of asphaltene occurs; where $d$ is the solvent density; $\sqrt{MW}$ is the square root of the molecular weight of the solvent; and K has a value of 3.2–3.8 when the solvent consists essentially of at least one of the mono-olefin hydrocarbons, 3.5–4.3 when the solvent consists essentially of at least one of the paraffin hydrocarbons, and a value between 3.2 and 4.3 when the solvent is a mixture of the mono-olefin and paraffin hydrocarbons with the minimum value of K within this range varying directly and the maximum value of K indirectly with the paraffin hydrocarbon content of the solvent when treating a given asphalt-type bituminous material; the separated heavy asphaltene fraction being in the liquid phase and having a viscosity whereby it is freely flowable from the treating zone; and withdrawing the liquid phase asphaltene fraction from the treating zone, the asphaltene fraction having a softening point of at least about 300° F.

20. The method of claim 19 wherein the temperature of the lighter solvent fraction containing dissolved residual asphalt-type bituminous material including oils is increased to above the equilibrium temperature of the solvent at the prevailing pressure to separate solvent.

21. The method of claim 19 wherein each volume of the asphalt-type bituminous material is treated with at least 4 volumes of solvent.

22. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one paraffin hydrocarbon containing from 5 through 8 carbon atoms inclusive, the temperature of treatment being at least 175° F. and sufficient to form a liquid to liquid bulk interface between the resulting heavy asphaltene fraction and the lighter solvent fraction containing dissolved residual asphalt-type bituminous material, the temperature and pressure of treatment being so adjusted as to provide a solvent density at least as great as the density value indicated by the equation $$d = \frac{K}{\sqrt{MW}}$$

but less than the solvent density at which no liquid phase separation of asphaltene occurs, where $d$ is the solvent density, $\sqrt{MW}$ is the square root of the molecular weight of the solvent, and K has a value between 3.5 and 4.3, the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least about 300° F.

23. A method of separating an asphalt-type bituminous material including asphaltenes into at least two fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one mono-olefin hydrocarbon containing from 4 through 7 carbon atoms inclusive, the temperature of treatment being at least 125° F. and sufficient to form a liquid to liquid bulk interface between the resulting heavy asphaltene fraction and the lighter solvent fraction containing dissolved residual asphalt-type bituminous material, the temperature and pressure of treatment being so adjusted as to provide a solvent density at least as great as the density value indicated by the equation $$d = \frac{K}{\sqrt{MW}}$$

but less than the solvent density at which no liquid phase separation of asphaltene occurs, where $d$ is the solvent density, $\sqrt{MW}$ is the square root of the molecular weight of the solvent, and K has a value between 3.2 and 3.8, the separated heavy asphaltene fraction being in the liquid phase and having a viscosity whereby it is freely flowable from the treating zone, and withdrawing the liquid phase asphaltene fraction from the treating zone, the asphaltene fraction having a softening point of at least about 300° F.

24. A method of separating an asphalt-type bituminous material including asphaltenes, resins and oils into at least two fractions; which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent which consists essentially of at least one hydrocarbon selected from the group consisting of mono-olefin hydrocarbons containing from 4 through 7 carbon atoms inclusive and paraffin hydrocarbons containing from 5 through 8 carbon atoms inclusive; the temperature of treatment being at least 125° F. when the solvent consists essentially of at least one of the mono-olefin hydrocarbons, at least 175° F. when the solvent consists essentially of at least one of the paraffin hydrocarbons and, when the solvent is a mixture of the mono-olefin and paraffin hydrocarbons, the minimum temperature of treatment being intermediate 125° F. and 175° F. and varying directly within this range with the paraffin hydrocarbon content of the solvent; the temperature of treatment being sufficiently elevated to form a liquid to liquid bulk interface between the resulting heavy asphaltene fraction and the lighter solvent fraction containing dissolved residual asphalt-type bituminous material; the temperature and pressure of treatment being so adjusted as to provide a solvent density at least as great as the density value indicated by the equation $$d = \frac{K}{\sqrt{MW}}$$

but less than the solvent density at which no liquid phase separation of asphaltene occurs; where $d$ is the solvent density; $\sqrt{MW}$ is the square root of the molecular weight of the solvent; and K has a value of 3.2–3.8 when the solvent consists essentially of at least one of the mono-olefin hydrocarbons, 3.5–4.3 when the solvent consists essentially of at least one of the paraffin hydrocarbons, and a value between 3.2 and 4.3 when the solvent is a mixture of the mono-olefin and paraffin hydrocarbons with the minimum value of K within this range varying directly and the maximum value of K indirectly with the paraffin hydrocarbon content of the solvent when treating a given asphalt-type bituminous material; the separated heavy asphaltene fraction being in the liquid phase and having a viscosity where it is freely flowable from the treating zone; withdrawing the liquid phase asphaltene fraction for the treating zone, the asphaltene fraction having a softening point of at least about 300° F.; separating a fraction of residual asphalt-type bituminous material from a lighter solvent fraction including oils by treating in a treating zone under further elevated temperature and pressure conditions the lighter solvent fraction containing dissolved residual asphalt-type bituminous material, the temperature and pressure of this treatment being adjusted to provide a solvent density less than the minimum density value indicated by the equation $$d = \frac{K}{\sqrt{MW}}$$

above but greater than 0.23 g./cc.; the separated fraction of residual asphalt-type bituminous material being in the liquid phase and having a viscosity whereby it is freely flowable from the treating zone; and withdrawing the liquid phase fraction of residual asphalt-type bituminous material from the treating zone.

25. The method of claim 24 wherein the temperature of the lighter solvent fraction containing dissolved residual asphalt-type bituminous material including oils is increased to above the equilibrium temperature of the solvent at the prevailing pressure to separate solvent.

26. The method of claim 24 wherein solvent is recovered from the lighter solvent fraction containing dissolved residual asphalt-type bituminous material including oils and the resulting oils are passed to a process for producing gasoline therefrom which includes a cracking step.

27. The method of claim 24 wherein each volume of the asphalt-type bituminous material is treated with at least 4 volumes of solvent.

28. A method of separating an asphalt-type bituminous material including asphaltenes, resins and oils into a plurality of fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one paraffin hydrocarbon containing from 5 through 8 carbon atoms inclusive, the temperature of treatment being at least 175° F. and sufficient to form a liquid to liquid bulk interface between the resulting heavy asphaltene fraction and the lighter solvent fraction containing dissolved residual asphalt-type bituminous material, the temperature and pressure of treatment being so adjusted as to provide a solvent density at least as great as the density value indicated by the equation $$d = \frac{K}{\sqrt{MW}}$$

but less than the solvent density at which no liquid phase separation of asphaltenes occurs, where $d$ is the solvent density, $\sqrt{MW}$ is the square root of the molecular weight of the solvent, and K has a value between 3.5 and 4.3, the separated heavy asphaltene fraction being in the liquid phase and having a viscosity whereby it is freely flowable from the treating zone, withdrawing the liquid phase asphaltene fraction from the treating zone, the asphaltene fraction having a softening point of at least about 300° F., separating a fraction of residual asphalt-type bituminous material from a lighter solvent fraction including oils by treating in a treating zone under further elevated temperature and pressure conditions the lighter solvent fraction containing dissolved residual asphalt-type bituminous material, the temperature and pressure of this treatment being adjusted to provide a solvent density less than the minimum density value indicated by the equation $$d = \frac{K}{\sqrt{MW}}$$

above but greater than 0.23 g./cc., the separated fraction of residual asphalt-type bituminous material being in the liquid phase and having a viscosity whereby it is freely flowable from the treating zone, and withdrawing the liquid phase fraction of residual asphalt-type bituminous material from the treating zone.

29. A method of separating an asphalt-type bituminous material including asphaltenes into a plurality of fractions, which method comprises separating a heavy fraction containing essentially asphaltenes from a lighter solvent fraction containing dissolved residual asphalt-type bituminous material by treating in a single treating zone at elevated temperature and pressure each volume of the asphalt-type bituminous material with at least two volumes of a solvent consisting essentially of at least one mono-olefin hydrocarbon containing from 4 through 7 carbon atoms inclusive, the temperature of treatment being at least 125° F. and sufficient to form a liquid to liquid bulk interface between the resulting heavy asphaltene fraction and the lighter solvent fraction containing dissolved residual asphalt-type bituminous material, the temperature and pressure of treatment being adjusted so as to provide a solvent density at least as great as the density value indicated by the equation $$d = \frac{K}{\sqrt{MW}}$$

but less than the solvent density at which no liquid phase separation of asphaltenes occurs, where $d$ is the solvent density, $\sqrt{MW}$ is the square root of the molecular weight of the solvent, and K has a value between 3.2 and 3.8, the separated heavy asphaltene fraction being in the liquid phase and having a viscosity whereby it is freely flowable from the treating zone, withdrawing the fluid phase asphaltene fraction from the treating zone, the asphaltene fraction having a softening point of at least about 300° F., separating a resin fraction by treating in a treating zone under further elevated temperature and pressure conditions the lighter solvent fraction containing dissolved residual asphalt-type bituminous material, the temperature and pressure of this treatment being adjusted to provide a solvent density less than the minimum density value indicated by the equation $$d = \frac{K}{\sqrt{MW}}$$

above but greater than 0.23 g./cc., the separated resin fraction being in the liquid phase and having a viscosity whereby it is freely flowable from the treating zone, and withdrawing the liquid phase resin fraction from the treating zone.

30. A method of separating an asphalt-type bituminous material including asphaltenes, resins and oils into at least two fractions, which method comprises separating a heavy fraction containing essentially asphaltenes and resins substantially free of asphaltic oils from a lighter solvent fraction containing dissolved residual asphalt-type bituminous material including oils by treating in a single treating zone at elevated temperature and pressure each volume of the asphalt-type bituminous material with at least two volumes of a solvent which consists essentially of at least one hydrocarbon selected from the group consisting of mono-olefin hydrocarbons containing from 4 through 7 carbon atoms inclusive and paraffin hydrocarbons containing from 5 through 8 carbon atoms inclusive; the temperature of treatment being greater than 50° F. below the critical and sufficiently elevated to form a liquid-to-liquid bulk interface between the resulting heavy asphaltene-resin fraction and the lighter solvent fraction containing dissolved residual asphalt-type bituminous material including oils, the temperature and pressure of treatment being so adjusted as to provide a solvent density greater than 0.23 g./cc. but less than the density value indicated by the equation $$d = \frac{K}{\sqrt{MW}}$$

and less than the solvent density at which no liquid phase separation of the asphaltene-resin fraction occurs, where $d$ is the solvent density, $\sqrt{MW}$ is the square root of the molecular weight of the solvent, and K has a value of 3.2–3.8 when the solvent consists essentially of at least one of the mono-olefin hydrocarbons, 3.5–4.3 when the solvent consists essentially of at least one of the paraffin hydrocarbons, and a value between 3.2 and 4.3 when the solvent is a mixture of the mono-olefin and paraffin hydrocarbons with the minimum value of K within this range varying directly and the maximum value of K indirectly with the paraffin hydrocarbon content of the solvent when treating a given asphalt-type bituminous material, the separated substantially asphaltic oil-free asphaltene-resin fraction being in the liquid phase and having a viscosity whereby it is freely flowable from the treating zone, and withdrawing the liquid phase asphaltene-resin fraction from the treating zone.

31. The method of claim 30 wherein the temperature of the lighter solvent fraction containing dissolved residual asphalt-type bituminous material including oils is increased to above the equilibrium temperature of the solvent at the prevailing pressure to separate solvent.

32. The method of claim 30 wherein solvent is recovered from the lighter solvent fraction containing dissolved residual asphalt-type bituminous material including oils and the resulting oils are passed to a process for producing gasoline therefrom which includes a cracking step.

33. The method of claim 30 wherein each volume of the asphalt-type bituminous material is treated with at least 4 volumes of solvent.

34. A method of separating an asphalt-type bituminous material including asphaltenes, resins and oils into at least two fractions, which method comprises separating a heavy fraction containing essentially asphaltenes and resins substantially free of asphaltic oils from a lighter solvent fraction containing dissolved residual asphalt-type bituminous material including oils by treating in a single treating zone at elevated temperature and pressure each volume of the asphalt-type bituminous material with at least two volumes of a solvent consisting essentially of at least one paraffin hydrocarbon containing from 5 through 8 carbon atoms inclusive, the temperature of treatment being at least 175° F. and sufficient to form a liquid-to-liquid bulk interface between the resulting heavy asphaltene-resin fraction and the lighter solvent fraction containing dissolved residual asphalt-type bituminous material including oils, the temperature and pressure of treatment being so adjusted as to provide a solvent density greater than 0.23 g./cc. but less than the density value indicated by the equation $$d = \frac{K}{\sqrt{MW}}$$

and less than the solvent density at which no liquid phase separation of the asphaltene-resin fraction occurs, where $d$ is the solvent density, $\sqrt{MW}$ is the square root of the molecular weight of the solvent, and K has a value between 3.5 and 4.3, the separated substantially asphaltic oil-free asphaltene-resin fraction being in the liquid phase and having a viscosity whereby it is freely flowable from the treating zone, and withdrawing the liquid phase asphaltene-resin fraction from the treating zone.

35. A method of separating an asphalt-type bituminous material including asphaltenes, resins and oils into at least two fractions, which method comprises separating a heavy fraction containing essentially asphaltenes and resins substantially free of asphaltic oils from a lighter solvent fraction containing dissolved residual asphalt-type bituminous material including oils by treating in a single treating zone at elevated temperature and pressure each volume of the asphalt-type bituminous material with at least two volumes of a solvent consisting essentially of at least one mono-olefin hydrocarbon containing from 4 through 7 carbon atoms inclusive, the temperature of treatment being at least 125° F. and sufficient to form a liquid-to-liquid bulk interface between the resulting heavy asphaltene fraction and the lighter solvent fraction containing dissolved residual asphalt-type bituminous material including oils, the temperature and pressure of treatment being adjusted so as to provide a solvent density greater than 0.23 g./cc. but less than the density value indicated by the equation $$d = \frac{K}{\sqrt{MW}}$$

and less than the solvent density at which no liquid phase separation of the asphaltene-resin fraction occurs, where $d$ is the solvent density, $\sqrt{MW}$ is the square root of the molecular weight of the solvent, and K has a value between 3.2 and 3.8, the separated substantially asphaltic oil-free asphaltene-resin fraction being in the liquid phase and having a viscosity whereby it is freely flowable from the treating zone, and withdrawing the fluid phase asphaltene-resin fraction from the treating zone.

36. A method of producing gasoline from asphalt-type bituminous material comprising the steps of separating at least one heavy fraction containing components heavier than soft resins from a lighter solvent fraction containing dissolved oils by treating in a treating zone at elevated temperature and pressure each volume of the asphalt-type bituminous material with at least two volumes of a solvent which consists essentially of at least one hydrocarbon selected from the group consisting of mono-olefin hydrocarbons containing from 4 through 7 carbon atoms inclusive and paraffin hydrocarbons containing from 5 through 8 carbon atoms inclusive, the temperature of treatment being greater than 50° F. below the critical temperature of the solvent and sufficiently elevated to form a liquid to liquid bulk interface between the resulting heavy fraction and the lighter fraction, the pressure at temperatures up to the critical temperature being at least sufficient to maintain liquid phase conditions in the treating zone and at temperatures above the critical temperature the pressure being at least equal to the value obtained by extrapolating the vapor pressure curve of the solvent by a Cox vapor pressure chart extrapolation using water as a reference substance, the separated heavy fraction being in the liquid phase and having a viscosity whereby it is freely flowable from the treating zone, separating the liquid phase heavy fraction from the lighter solvent fraction containing dissolved oils, recovering solvent from the lighter solvent fraction to produce an oil fraction, and passing the resulting oil fraction to a process for producing gasoline therefrom which includes a cracking step.

37. A method of producing gasoline from asphalt-type bituminous material comprising the steps of separating at least one heavy fraction containing components heavier than soft resins from a lighter solvent fraction containing dissolved oils by treating in a treating zone at elevated temperature and pressure each volume of the asphalt-type bituminous material with at least two volumes of a solvent which consists essentially of at least one hydrocarbon selected from the group consisting of mono-olefin hydrocarbons containing from 4 through 7 carbon atoms inclusive and paraffin hydrocarbons containing from 5 through 8 carbon atoms inclusive, the temperature of treatment being greater than 50° F. below the critical temperature of the solvent and sufficiently elevated to form a liquid to liquid bulk interface between the resulting heavy fraction and the lighter solvent fraction including dissolved oils, the temperature and pressure of treatment being so adjusted as to provide a solvent density greater than 0.23 g./cc. but less than the density value indicated by the equation $$d = \frac{K}{\sqrt{MW}}$$

and less than the solvent density at which no liquid phase separation of heavy fraction occurs, where $d$ is the solvent density, $\sqrt{MW}$ is the square root of the molecular weight of the solvent, and K has a value of 3.2–3.8 when the solvent consists essentially of at least one of the mono-olefin hydrocarbons, 3.5–4.3 when the solvent consists essentially of at least one of the paraffin hydrocarbons and a value between 3.2 and 4.3 when the solvent is a mixture of the mono-olefin and paraffin hydrocarbons with the minimum value of K within this range varying directly and the maximum value of K indirectly with the paraffin hydrocarbon content of the solvent when treating a given asphalt-type bituminous material, the separated heavy fraction being in the liquid phase and having a viscosity whereby it is freely flowable from the treating zone, separating the liquid phase heavy fraction from the lighter solvent fraction containing dissolved oils, recovering solvent from the lighter solvent fraction to produce an oil fraction, and passing the resulting oil fraction to a process for producing gasoline therefrom which includes a cracking step.

38. The method of claim 4 wherein the solvent consists essentially of normal pentane.

39. The method of claim 4 wherein the solvent consists essentially of isopentane.

40. The method of claim 4 wherein the solvent consists essentially of normal hexane.

41. The method of claim 5 wherein the solvent consists essentially of isobutylene.

42. The method of claim 5 wherein the solvent consists essentially of normal butylene.

43. The method of claim 34 wherein the solvent consists essentially of normal pentane.

44. The method of claim 34 wherein the solvent consists essentially of isopentane.

45. The method of claim 34 wherein the solvent consists essentially of normal hexane.

46. The method of claim 35 wherein the solvent consists essentially of isobutylene.

47. The method of claim 35 wherein the solvent consists essentially of normal butylene.

References Cited in the file of this patent

UNITED STATES PATENTS

| | | |
|---|---|---|
| 1,868,211 | Le Noble | July 19, 1932 |
| 2,115,003 | Beiswenger | Apr. 26, 1938 |
| 2,116,188 | Churchill | May 3, 1938 |
| 2,131,205 | Wells et al. | Sept. 27, 1938 |
| 2,146,679 | Koenemann et al. | Feb. 7, 1939 |
| 2,148,716 | Whiteley et al. | Feb. 28, 1939 |
| 2,188,012 | Pilat et al. | Jan. 23, 1940 |
| 2,202,389 | Lewis et al. | May 28, 1940 |
| 2,281,865 | Van Dijck | May 5, 1942 |
| 2,500,757 | Kiersted | Mar. 14, 1950 |